(12) United States Patent
Han

(10) Patent No.: US 12,261,927 B2
(45) Date of Patent: Mar. 25, 2025

(54) MASTER DEVICE TO COMMUNICATE WITH SLAVE DEVICE, SLAVE DEVICE, METHOD OF CONTROLLING THE SAME, AND DISPLAY DEVICE INCLUDING THE SAME

(71) Applicant: Samsung Display Co., Ltd., Yongin-Si (KR)

(72) Inventor: Dong Kwan Han, Yongin-si (KR)

(73) Assignee: Samsung Display Co., Ltd., Yongin-Si (KR)

( * ) Notice: Subject to any disclaimer, the term of this patent is extended or adjusted under 35 U.S.C. 154(b) by 84 days.

(21) Appl. No.: 18/221,395

(22) Filed: Jul. 13, 2023

(65) Prior Publication Data

US 2024/0283628 A1 Aug. 22, 2024

(30) Foreign Application Priority Data

Feb. 17, 2023 (KR) .......................... 10-2023-0021355

(51) Int. Cl.
*H04L 7/00* (2006.01)
(52) U.S. Cl.
CPC .................................. *H04L 7/0008* (2013.01)
(58) Field of Classification Search
CPC ..................................................... H04L 7/0008
USPC ................................. 375/354, 219, 295, 316
See application file for complete search history.

(56) References Cited

U.S. PATENT DOCUMENTS

| 6,874,047 | B1 | 3/2005 | Duguay et al. |
| 10,133,692 | B2 | 11/2018 | Huh et al. |
| 2016/0294544 | A1* | 10/2016 | Jang ......................... H04B 1/16 |
| 2021/0026795 | A1 | 1/2021 | Li et al. |

FOREIGN PATENT DOCUMENTS

KR 10-2328014 B1 11/2021

* cited by examiner

*Primary Examiner* — Zewdu A Kassa
(74) *Attorney, Agent, or Firm* — Innovation Counsel LLP

(57) ABSTRACT

The master device includes a first pad connected to a slave device through a first wire; a second pad connected to the slave device through a second wire; and a communication interface to transmit a communication control signal to the slave device through the first pad, and, through the second pad, to transmit a first data signal synchronized with the communication control signal to the slave device and to receive a second data signal synchronized with the communication control signal from the slave device. The first data signal is transmitted to the slave device by the master device in a write mode and the second data signal is transmitted to the master device by the slave device in a read mode. The communication interface is configured to start the read mode by transiting the communication control signal from a first voltage level to a second voltage level while the second pad has a predetermined voltage level.

22 Claims, 15 Drawing Sheets

MASTER DEVICE TO COMMUNICATE WITH SLAVE DEVICE, SLAVE DEVICE, METHOD OF CONTROLLING THE SAME, AND DISPLAY DEVICE INCLUDING THE SAME

This application claims priority to Korean Patent Application No. 10-2023-0021355, filed on Feb. 17, 2023, which is hereby incorporated by reference for all purposes as if fully set forth herein.

BACKGROUND

1. Field

The disclosure relates to an electronic device, and more particularly, to a master device to communicate with a slave device, the slave device, a method of controlling the same, and a display device including the same.

2. Description of the Related Art

A communication system employing serial communication communicates data in a unit of one bit through a communication channel. The serial communication contrasts with parallel communication which communicates data in a unit of multiple bits through multiple parallel channels.

A communication system may be designed to interconnect two integrated circuits. The integrated circuit becomes more expensive as the integrated circuit includes more pins. In order to reduce the number of pins, the communication system may employ the serial communication. For example, the communication system may employ serial peripheral interface (SPI) communication, inter-integrated circuit ($I^2C$) communication, or the like. The $I^2C$ communication performs communication between a master device and a slave device through a channel including a serial data line (SDA) pulled up by resistors and a serial clock line (SCL). In the $I^2C$ communication, the master device requires to preferentially output an address corresponding to the slave device, a type of an operation to be performed (for example, reading or writing) to a channel in order to communicate data (or a command) with the slave device.

The above-described content is only intended to help understanding of the background of the technical ideas of the disclosure, and thus it cannot be understood as the prior art known to those skilled in the art.

SUMMARY

A master device, a slave device, and a method of controlling the same according to embodiments of the disclosure may perform reading and writing between the master device and the slave device at an improved speed. For example, the master device may include a first pad, a second pad, and an interface that communicates with the slave device through the first and second pads, and the interface may transmit a command indicating not only a type of an operation to be performed but also one of a start and an end of the corresponding operation type to the slave device, through a combination of a voltage signal of the first pad and a voltage signal of the second pad.

In addition, the display device according to embodiments of the disclosure may include the master device and/or the slave device that perform reading and writing between the master device and the slave device at an improved speed.

According to an embodiment of the disclosure, a master device to communicate with a slave device includes a first pad connected to the slave device through a first wire, a second pad connected to the slave device through a second wire, and a communication interface to transmit a communication control signal to the slave device through the first pad, and, through the second pad, to transmit a first data signal synchronized with the communication control signal to the slave device and to receive a second data signal synchronized with the communication control signal from the slave device. The first data signal is transmitted to the slave device by the master device in a write mode and the second data signal is transmitted to the master device by the slave device in a read mode. The communication interface is configured to start the read mode by transiting the communication control signal from a first voltage level to a second voltage level while the second pad has a predetermined voltage level.

The communication interface may be configured to transmit a plurality of clock pulses to the slave device as the communication control signal after the read mode is started.

In the read mode, the second data signal transmitted by the slave device may be synchronized with at least some of the plurality of clock pulses.

The master device may further include a controller to control the communication interface. The communication interface may be configured to provide data bits corresponding to the second data signal to the controller in response to a voltage of the second pad having a logic high at a time when a last clock pulse of the plurality of clock pulses is transmitted.

The first data signal may have a voltage that changes to a first logic level and a second logic level in synchronization with the plurality of clock pulses, and the predetermined voltage level may correspond to the first logic level.

The second voltage level may be lower than the first voltage level.

In the read mode, after the second data signal is transmitted by the slave device, the second pad may be biased to the predetermined voltage level. The communication interface may be configured to end the read mode by transiting the communication control signal from the second voltage level to the first voltage level while the second pad has the predetermined voltage level.

The communication interface may be configured to start the write mode by transiting a voltage of the second pad from a first logic level to a second logic level while controlling the communication control signal to have the first voltage level. The predetermined voltage level may correspond to the first logic level.

The communication interface may be configured to transmit a plurality of clock pulses to the slave device as the communication control signal after the write mode is started, and to transmit the first data signal to the slave device in synchronization with the plurality of clock pulses.

After the first data signal is transmitted to the slave device in the write mode, the communication interface may be configured to end the write mode by transiting the voltage of the second pad from the second logic level to the first logic level while controlling the communication control signal to have the first voltage level.

Another aspect of the disclosure relates to a method of controlling a master device connected to a slave device through a first wire and a second wire to communicate with a slave device. The method includes transmitting a read start command to the slave device, and receiving a data signal from the slave device through the second wire while transmitting a communication control signal to the first wire after the read start command is transmitted. Transmitting the read start command includes outputting the read start command by transiting the communication control signal from a first voltage level to a second voltage level while the second wire has a predetermined voltage level.

The receiving the data signal from the slave device may include transmitting a plurality of clock pulses to the slave device as the communication control signal, and the data signal may be synchronized with the plurality of clock pulses.

The method may further include determining data bits corresponding to the data signal as normal data in response to a voltage of the second wire having a logic high at a time when a last clock pulse of the plurality of clock pulses is transmitted.

The method may further include transmitting the read start command to the slave device again in response to a voltage of the second wire which does not have a logic high at a time when a last clock pulse of the plurality of clock pulses is transmitted.

The method may further include outputting a read end command by transiting the communication control signal from the second voltage level to the first voltage level while the second wire has the predetermined voltage level after the data signal is received from the slave device.

The method may further include transmitting a write start command to the slave device, and transmitting another data signal to the slave device through the second wire while transmitting the communication control signal to the first wire, after the write start command is transmitted. The transmitting the write start command may include outputting the write start command by transiting a voltage of the second wire from a first logic level to a second logic level while controlling the communication control signal to have the first voltage level.

Still another aspect of the disclosure relates to a display device. The display device includes a display panel, and a driver integrated circuit connected to the display panel through a plurality of signal lines to drive the display panel. The driver integrated circuit includes a first pad and a second pad connected to a power management integrated circuit configured to provide a power voltage to at least one of the display panel and the driver integrated circuit, and a communication interface to transmit a communication control signal to the power management integrated circuit through the first pad, and, through the second pad, to transmit a first data signal synchronized with the communication control signal to the power management integrated circuit and to receive a second data signal synchronized with the communication control signal from the power management integrated circuit. The first data signal is transmitted to the power management integrated circuit by the driver integrated circuit in a write mode, and the second data signal is transmitted to the driver integrated circuit by the power management integrated circuit in a read mode. The communication interface is configured to start the read mode by transiting the communication control signal from a first voltage level to a second voltage level while the second pad has a predetermined voltage level.

The communication interface may be configured to start the write mode by transiting a voltage of the second pad from a first logic level to a second logic level while controlling the communication control signal to have the first voltage level. The predetermined voltage level may correspond to the first logic level.

In the write mode, the power voltage may be adjusted according to the first data signal transmitted to the power management integrated circuit by the driver integrated circuit.

The driver integrated circuit may be mounted on a circuit board different from a circuit board on which the power management integrated circuit is mounted.

Still another aspect of the disclosure related to a slave device to communicate with a master device. The slave device includes a first pad connected to the master device through a first wire, a second pad connected to the master device through a second wire, and a communication interface configured to receive a communication control signal from the master device through the first pad and to communicate a data signal synchronized with the communication control signal with the master device through the second pad. In a write mode, a first data signal is transmitted to the slave device by the master device and, in a read mode, a second data signal is transmitted to the master device by the slave device. The communication interface is configured to detect the read mode when the communication control signal transits from a first voltage level to a second voltage level while the second pad has a predetermined voltage level, and to transmit the second data signal to the master device to be synchronized with the communication control signal.

The slave device may further include a storage medium coupled to the communication interface. The communication interface may be configured to store data bits according to the first data signal, which is transmitted from the master device, in the storage medium in the write mode, and to transmit the second data signal to the master device according to the data bits stored in the storage medium in the read mode.

According to embodiments of the disclosure, the master device and the slave device performing reading and writing between the master device and the slave device at an improved speed, and a method of controlling the master device and the slave device may be provided.

According to embodiments of the disclosure, the display device including the master device and/or the slave device performing reading and writing between the master device and the slave device at an improved speed may be provided.

An effect according to embodiments is not limited to a content exemplified above, and more various effects are included in the present specification.

BRIEF DESCRIPTION OF THE DRAWINGS

The above and other features of the disclosure will become more apparent by describing in further detail embodiments thereof with reference to the accompanying drawings, in which.

DETAILED DESCRIPTION OF THE EMBODIMENT

Figure 1:
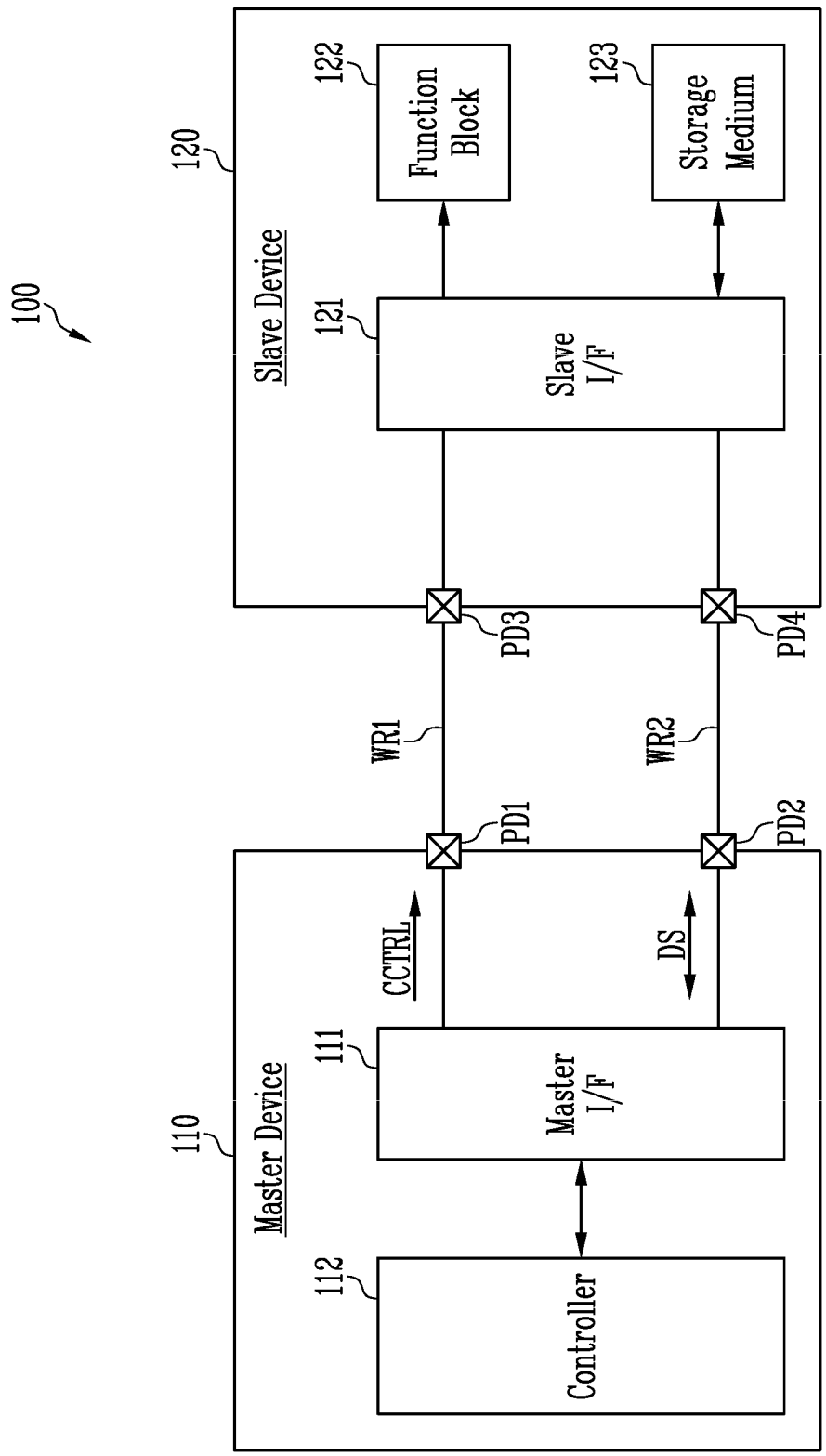
FIG. 1 is a block diagram illustrating a data processing system according to an embodiment of the disclosure.

Hereinafter, a preferred embodiment according to the disclosure is described in detail with reference to the accompanying drawings. It should be noted that only parts necessary for understanding an operation according to the disclosure are described and a description of other parts is omitted in order not to obscure the subject matter of the disclosure in the following description. In addition, the disclosure may be embodied in other forms without being limited to an embodiment described herein. However, the embodiment described herein is provided to describe in detail enough to easily implement the technical spirit of the disclosure to those skilled in the art to which the disclosure belongs.

Throughout the specification, a case where a portion is "connected" to another portion, the case includes not only a case where the portion is "directly connected" but also a case where the portion is "indirectly connected" with another element interposed therebetween. A term used herein is for describing specific embodiments and is not intended to limit the disclosure. Throughout the specification, a case where a certain portion "includes" means that the certain portion may further include another component without excluding another component unless otherwise stated. "At least one of X, Y, and Z" and "at least one selected from a group consisting of X, Y, and Z" may be interpreted as one X, one Y, one Z, or any combination of two or more of X, Y, and Z (for example, XYZ, XYY, YZ, and ZZ). Here, "and/or" includes all combinations of one or more of corresponding configurations.

Here, terms such as first and second may be used to describe various components, but these components are not limited to these terms. These terms are used to distinguish one component from another component. Therefore, a first component may refer to a second component within a range without departing from the scope disclosed herein.

Various embodiments are described with reference to drawings schematically illustrating ideal embodiments. Accordingly, it will be expected that shapes may vary, for example, according to tolerances and/or manufacturing techniques. Therefore, the embodiments disclosed herein cannot be construed as being limited to specific shapes shown, and should be interpreted as including, for example, changes in shapes that occur as a result of manufacturing. As described above, the shapes shown in the drawings may not show actual shapes of areas of a device, and the present embodiments are not limited thereto.

FIG. 1 is a block diagram illustrating a data processing system according to an embodiment of the disclosure.

Referring to FIG. 1, the data processing system 100 may include a master device 110 and a slave device 120. The master device 110 and the slave device 120 are connected to each other through first and second wires WR1 and WR2.

The master device 110 communicates with the slave device 120 through the first and second wires WR1 and WR2. The master device 110 may include first and second pads PD1 and PD2, a master interface (Master I/F) 111, and a controller 112.

The first pad PD1 is connected to the first wire WR1 and the second pad PD2 is connected to the second wire WR2.

As a communication interface that communicates with the slave device 120 in response to control of the controller 112, the master interface 111 may be provided to the master device 110. The master interface 111 is connected to the first and second wires WR1 and WR2 through the first and second pads PD1 and PD2, respectively.

The master interface 111 may transmit a communication control signal CCTRL to the slave device 120 through the first pad PD1 in response to the control of the controller 112. For example, the communication control signal CCTRL may include a plurality of clock pulses.

The master interface 111 may communicate a data signal DS with the slave device 120 through the second pad PD2 in response to the control of the controller 112. For example, the master interface 111 may transmit the data signal to the slave device 120 and/or may receive the data signal from the slave device 120. The data signal DS may be communicated between the master device 110 and the slave device 120 in synchronization with the plurality of clock pulses of the communication control signal CCTRL. In a write mode, the master interface 111 may transmit the data signal DS synchronized with the communication control signal CCTRL to the slave device 120. In a read mode, the master interface 111 may receive the data signal DS synchronized with the communication control signal CCTRL from the slave device 120.

According to an embodiment of the disclosure, the communication control signal CCTRL may be provided as clock pulses synchronized with the data signal DS, and may function as a command for starting (or initiating) the read mode and the write mode.

The controller 112 may perform various operations related to functions provided by the slave device 120. The controller 112 is configured to communicate with the slave device 120 by controlling the master interface 111.

The controller 112 may transmit a plurality of data bits to the master interface 111 while requesting writing to the master interface 111. In this case, the master interface 111 may transmit the data bits received from the controller 112 to the slave device 120 as the data signal DS.

The controller 112 may request reading to the master interface 111. In this case, the master interface 111 may receive the data signal DS from the slave device 120 and provide the data bits corresponding to the received data signal DS to the controller 112.

The slave device 120 communicates with the master device 110 through the first and second wires WR1 and WR2. The slave device 120 may include third and fourth pads PD3 and PD4, a slave interface (Slave I/F) 121, at least one function block 122, and a storage medium 123.

The third pad PD3 is connected to the first wire WR1 and the fourth pad PD4 is connected to the second wire WR2.

As a communication interface that communicates with the master interface 111 of the master device 110, the slave interface 121 may be provided to the slave device 120. The slave interface 121 is connected to the first and second wires WR1 and WR2 through the third and fourth pads PD3 and PD4, respectively.

The slave interface 121 may receive the communication control signal CCTRL through the third pad PD3. The slave interface 121 may communicate the data signal DS with the master interface 111 through the fourth pad PD4. For example, the slave interface 121 may transmit the data signal to the master device 110 and/or may receive the data signal from the master device 110.

In the write mode, the slave interface 121 may receive the data signal DS synchronized with the clock pulses of the communication control signal CCTRL from the master interface 111. The slave interface 121 may provide the data bits according to the received data signal DS to the function block 122. In addition, the slave interface 121 may store the data bits according to the received data signal DS in the storage medium 123. For example, the storage medium 123 may be repeatedly updated by the slave interface 121 to store the data bits according to the data signal DS received in at least one most recent write mode.

In the read mode, the slave interface 121 may read the data bits stored in the storage medium 123 and provide the read data bits to the master interface 111 as the data signal DS synchronized with the clock pulses of the communication control signal CCTRL.

The function block 122 may operate in response to the data bits received through the slave interface 121. The function block 122 may perform various functions according to embodiments, and functions thereof may be controlled by the data bits received through the slave interface 121. For example, the function block 122 may be configured to generate at least one power voltage and may adjust a level of the corresponding power voltage according to the data bits received through the slave interface 121.

The storage medium 123 may include one of various types of storage media accessible by the slave interface 121. In embodiments, the storage medium 123 may include any one of storage media such as a register, a static random access memory (SRAM), and a dynamic random access memory (DRAM). The storage medium 123 may operate in response to control of the slave interface 121. The storage medium 123 may store the data bits received from the slave interface 121 and output the stored data bits to the slave interface 121.

In embodiments, the slave device 120 may be implemented as a power management integrated circuit (PMIC), a power supply module, a radio frequency integrated circuit (RFIC), a connectivity chip, a sensor, a fingerprint recognition chip, or the like, which may be controlled by the master device 110 through a communication channel of the first and second wires WR1 and WR2.

Figure 2:
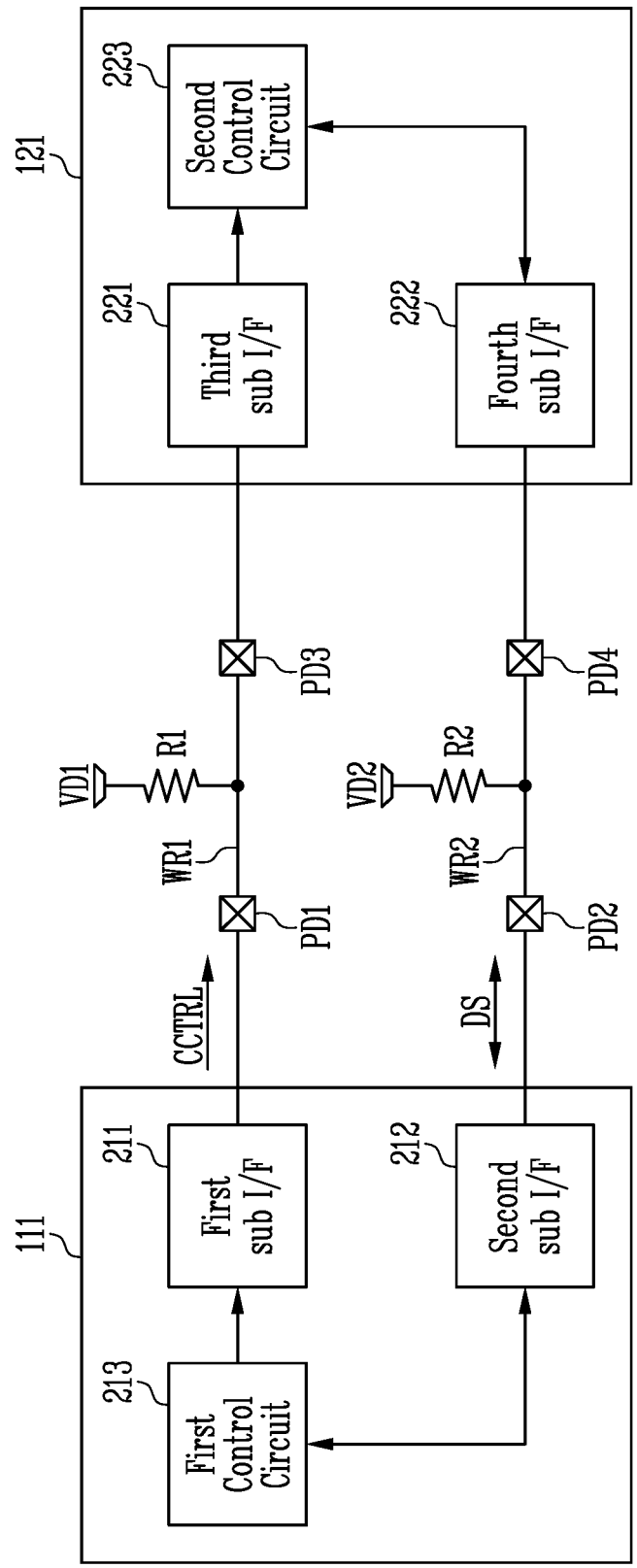
FIG. 2 is a block diagram illustrating an embodiment of a master interface and a slave interface of FIG. 1.

FIG. 2 is a block diagram illustrating an embodiment of the master interface and the slave interface of FIG. 1.

Referring to FIG. 2, the master interface 111 may include a first sub interface 211 (first sub I/F), a second sub interface 212 (second sub I/F), and a first control circuit 213.

The first sub interface 211 may transmit the communication control signal CCTRL to the slave interface 121 through the first pad PD1 in response to control of the first control circuit 213. The second sub interface 212 may transmit the data signal DS to the slave interface 121 and receive the data signal DS from the slave interface 121 through the second pad PD2 in response to the control of the first control circuit 213.

The first control circuit 213 may control general operations of the master interface 111 under the control of the controller 112 of FIG. 1.

The controller 112 may request reading. In this case, the first control circuit 213 may transmit a combination of the communication control signal CCTRL and a voltage combination of the second pad PD2 to the slave interface 121 as a command indicating one of a start and an end of the read mode. In the read mode, the first control circuit 213 may receive the data signal DS synchronized with the clock pulses from the slave interface 121 through the second sub interface 212 while providing the clock pulses as the communication control signal CCTRL. The first control circuit 213 may provide the data bits according to the data signal DS to the controller 112.

In embodiments, the first control circuit 213 may latch the data signal DS received through the second sub interface 212 in response to the clock pulses of the communication control signal CCTRL. In embodiments, the first control circuit 213 may receive the clock pulses from a separate source and may latch the data signal DS in response to the clock pulses.

The controller 112 may request writing while providing the data bits. In this case, the first control circuit 213 may transmit a combination of the communication control signal CCTRL and a voltage combination of the second pad PD2 to the slave interface 121 as a command indicating one of a start and an end of the write mode. In the write mode, the first control circuit 213 may output the data signal DS, which corresponds to the data bits, synchronized with the clock pulses of the communication control signal CCTRL to the slave device 120 through the second sub interface 212.

In embodiments, the first control circuit 213 may output the data signal DS in response to the clock pulses of the communication control signal CCTRL or clock pulses from a separate source.

The slave interface 121 may include a third sub interface 221 (third sub I/F), a fourth sub interface 222 (fourth sub I/F), and a second control circuit 223.

The third sub interface 221 may transmit the communication control signal CCTRL received through the third pad PD3 to the second control circuit 223. The fourth sub interface 222 may transmit the data signal DS to the second control circuit 223 through the fourth pad PD4 in response to control of the second control circuit 223.

The second control circuit 223 is connected to the third pad PD3 through the third sub interface 221 and connected to the fourth pad PD4 through the fourth sub interface 222. The second control circuit 223 may detect a combination of the communication control signal CCTRL and a voltage of the fourth pad PD4 as a command indicating an operation type (for example, reading or writing) and indicating one of start and end of a corresponding operation.

In the read mode, the second control circuit 223 may read the data bits stored in the storage medium 123 of FIG. 1 and output the read data bits to the master device 110 through the fourth sub interface 222 as the data signal DS synchronized with the clock pulses of the communication control signal CCTRL.

In embodiments, the second control circuit 223 may output the data signal DS in response to the clock pulses of the communication control signal CCTRL. In embodiments, the second control circuit 223 may receive the clock pulses from a separate source and output the data signal DS in response to the clock pulses.

In the write mode, the second control circuit 223 may receive the data signal DS synchronized with the clock pulses of the communication control signal CCTRL through the fourth sub interface 222. The second control circuit 223 may provide the data bits from the master device 110 to the function block 122 of FIG. 1. In addition, the second control circuit 223 may update the data bits according to the data signal DS to the storage medium 123 of FIG. 1.

In embodiments, the second control circuit 223 may latch the data signal DS received from the master device 110 through the fourth sub interface 222 in response to the clock pulses of the communication control signal CCTRL or in response to the clock pulses from the separate source.

In embodiments, a first voltage VD1 may be applied to the first wire WR1 through a first resistor R1. For example, the first wire WR1 has a high voltage level (or logic high) when the first wire WR1 is not biased by the first sub interface 211, whereas the first wire WR1 has a low voltage level (or logic low) when the first wire WR1 is biased by the first sub interface 211. For example, the first sub interface 211 may include an open drain transistor, a drain of which is connected to the first resistor R1 and a source of which is connected to the ground or a reference voltage node. In this case, the first resistor R1 may be a pull up resistor connected to the drain of the transistor.

In embodiments, a second voltage VD2 may be applied to the second wire WR2 through a second resistor R2. The second voltage VD2 may be provided from the same source as the first voltage VD1. In this case, the second wire WR2 has a high voltage level when the second wire WR2 is not biased by either of the second sub interface 212 or the fourth sub interface 222. The second wire WR2 has a low voltage level when the second wire WR2 is biased by any one of the second sub interface 212 and the fourth sub interface 222. For example, each of the second and fourth sub interfaces 212 and 222 may include an open drain transistor, a drain of which is connected to the second resistor R2 and a source of which is connected to the ground or a reference voltage node. In this case, the second resistor R2 may be a pull up resistor connected to the drains of the transistors.

In embodiments, the first and second sub interfaces 211 and 212 may be configured similarly to those of a master of I²C communication, and the third and fourth sub interfaces 221 and 222 may be configured similarly to those of a slave of I²C communication.

Figure 3:
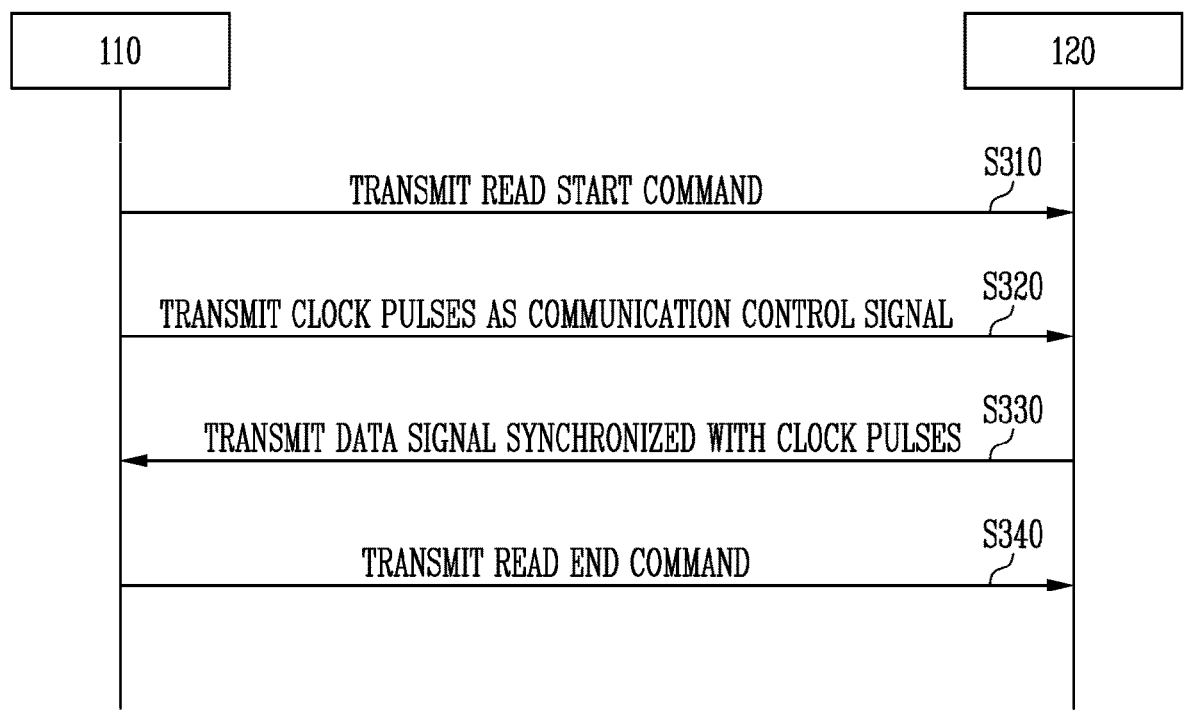
FIG. 3 is a flowchart illustrating operations of the master device and the slave device when reading is performed in the data processing system of FIG. 1.

FIG. 3 is a flowchart illustrating operations of the master device and the slave device when reading is performed in the data processing system of FIG. 1.

Referring to FIGS. 1 and 3, in S310, the master device 110 transmits the command indicating the start of the read mode (hereinafter, a read start command) to the slave device 120. According to an embodiment of the disclosure, the combination of the communication control signal CCTRL and the voltage of the second pad PD2 may be provided to the slave device 120 as the read start command. The communication control signal CCTRL is transmitted to the slave device 120 through the first wire WR1 and the voltage of the second pad PD2 is transmitted to the slave device 120 through the second wire WR2. The combination of the voltage of the second pad PD2 maintaining a predetermined level and the communication control signal CCTRL transiting from the high voltage level to the low voltage level may be provided as the read start command. Accordingly, the reading mode is started.

In S320, the master device 110 transmits the clock pulses to the slave device 120 as the communication control signal CCTRL. In S330, while the clock pulses are transmitted, the slave device 120 may transmit the data signal DS synchronized with the clock pulses to the master device 110.

In S340, the master device 110 transmits the command indicating the end of the read mode (hereinafter, a read end command) to the slave device 120. According to an embodiment of the disclosure, the combination of the communication control signal CCTRL and the voltage of the second pad PD2 may be provided as the read end command. The combination of the voltage of the second pad PD2 maintaining the predetermined level and the communication control signal CCTRL transiting from the low voltage level to the high voltage level may be provided as the read end command.

Figure 4:
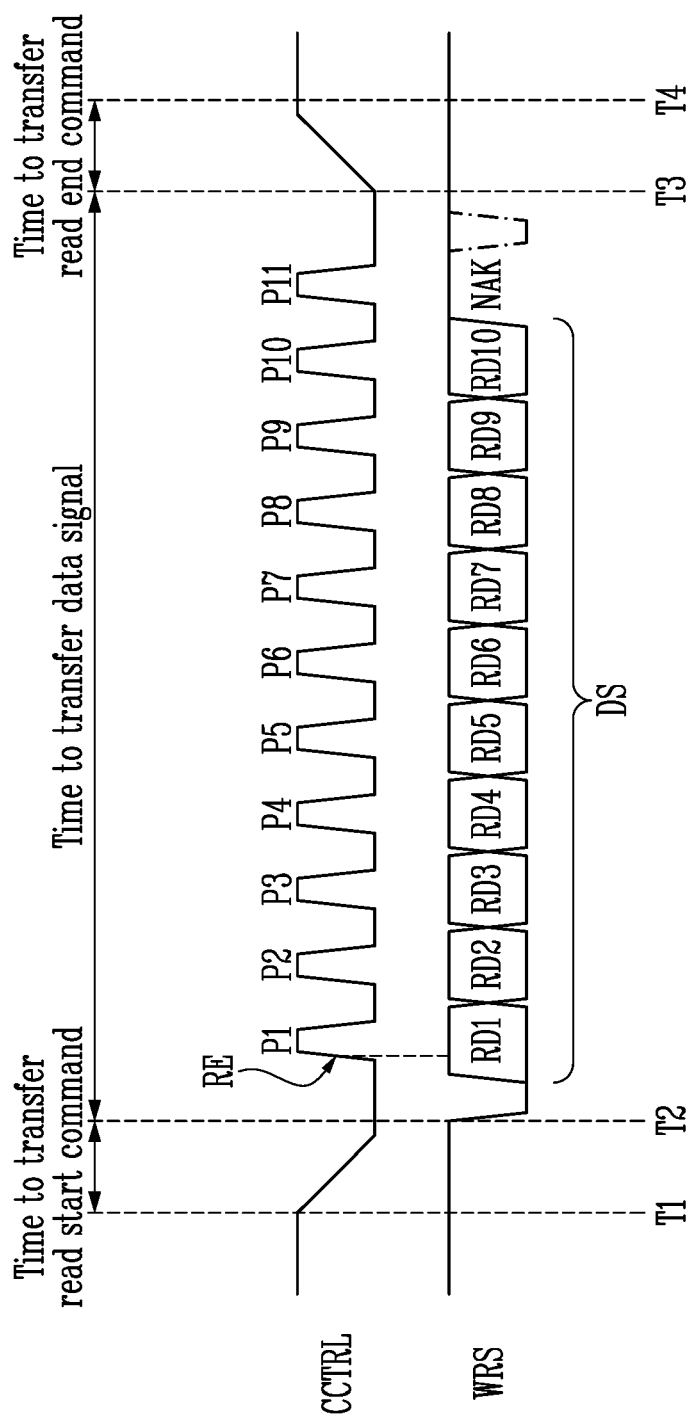
FIG. 4 is a timing diagram illustrating an embodiment of signals communicated between the master device and the slave device for the operations of FIG. 3.

FIG. 4 is a timing diagram illustrating an embodiment of signals communicated between the master device and the slave device for the operations of FIG. 3.

Referring to FIGS. 1 and 4, before a first time T1, the communication control signal CCTRL has the high voltage level. In other words, in a standby mode, the master device 110 may control the communication control signal CCTRL to the high voltage level. A wire voltage signal WRS may similarly have the high voltage level. Here, the wire voltage signal WRS means a voltage signal of the second wire WR2. The high voltage level of the wire voltage signal WRS may be a voltage level corresponding to a logical high level of the data signal DS. A low voltage level of the wire voltage signal WRS may be a voltage level corresponding to a logical low level of the data signal DS.

At the first time T1, the communication control signal CCTRL decreases from the high voltage level and reaches the low voltage level. The wire voltage signal WRS has the high voltage level. The wire voltage signal WRS continues to maintain the high voltage level until a second time T2. For example, any of the second sub interface 212 (refer to FIG. 2) of the master device 110 and the fourth sub interface 222 (refer to FIG. 2) of the slave device 120 may not bias the second wire WR2, and thus the wire voltage signal WRS may have the high voltage level.

As such, the master device 110 may transmit the read start command to the slave device 120 by transiting the communication control signal CCTRL from the high voltage level to the low voltage level while the wire voltage signal WRS maintains the high voltage level. In other words, in a time period between the first time T1 and the second time T2, a combination of the wire voltage signal WRS maintaining the high voltage level and the communication control signal CCTRL transiting from the high voltage level to the low voltage level may be provided to the slave device 120 as the read start command. According to the read start command, the slave device 120 may detect the start of the read mode.

Thereafter, a time period from the second time T2 to a third time T3 corresponds to the read mode. In the read mode, the master device 110 may provide the communication control signal CCTRL as first to eleventh clock pulses P1 to P11. In FIG. 4, 11 clock pulses P1 to P11 are provided, but this is an example, and the number of clock pulses P1 to P11 may variously change.

In the read mode, the slave device 120 may transmit the data signal DS through the second wire WR2, and the data signal DS may be provided as the wire voltage signal WRS. The data signal DS may include first to tenth read data units RD1 to RD10 synchronized with the first to tenth clock pulses P1 to P10, respectively. Each of the first to tenth read data units RD1 to RD10 may express one data bit by having a logic high or a logic low.

In embodiments, the first to tenth read data units RD1 to RD10 may be synchronized with rising edges RE of the first to tenth clock pulses P1 to P10, respectively. The master interface 111 of the master device 110 may detect logic levels of the first to tenth read data units RD1 to RD10 in response to the rising edges RE of the first to tenth clock pulses P1 to P10 and may latch data bits according to the detected logic levels.

The slave device 120 may further provide a read acknowledgment signal NAK synchronized with the eleventh clock pulse P11 to the second wire WR2. The read acknowledgement signal NAK may be a logic high. For example, the fourth sub interface 222 of the slave device 120 may not bias the second wire WR2 when the eleventh clock pulse P11 is generated. In this case, the read acknowledgement signal NAK of the logic high may be provided to the second wire WR2 due to the second voltage VD2 (refer to FIG. 2). In embodiments, the read acknowledgement signal NAK may maintain the logic high. In other embodiments, the read acknowledgement signal NAK may transit from the logic high to a logic low after a falling edge of the eleventh clock pulse P11, and then may transit from the logic low to the logic high again.

At the third time T3, the communication control signal CCTRL rises from the low voltage level to the high voltage level. The wire voltage signal WRS maintains the high voltage level.

As such, the master device 110 may transmit the read end command to the slave device 120 by transiting the communication control signal CCTRL from the low voltage level to the high voltage level while the wire voltage signal WRS maintains the high voltage level. In other words, in a time period between the third time T3 and a fourth time T4, a combination of the wire voltage signal WRS maintaining the high voltage level and the communication control signal CCTRL transiting from the low voltage level to the high voltage level may be provided to the slave device 120 as the read end command. According to the read end command, the slave device 120 may detect the end of the read mode.

As such, the combination of the communication control signal CCTRL and the wire voltage signal WRS may be provided as the read start command and the read end command. Accordingly, the master device 110 may transmit information indicating a type of an operation (for example, reading) to the slave device 120 without transmitting additional data bits to the slave device 120. In addition, the master device 110 may command one of a start and an end of a corresponding operation type to the slave device 120 without transmitting additional data bits. Therefore, the data processing system 100 may perform reading at an improved speed.

Figure 5:
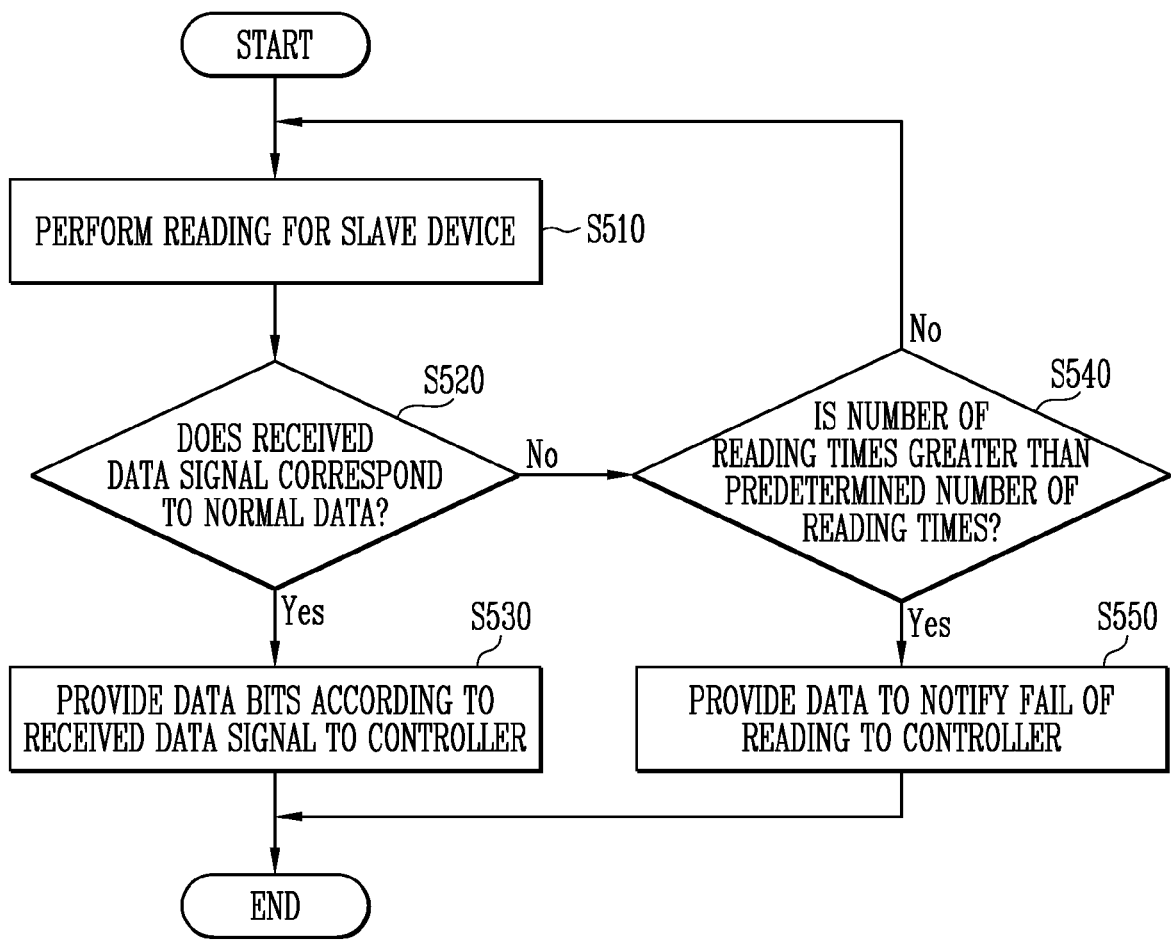
FIG. 5 is a flowchart illustrating an embodiment of operations of the master device when reading is performed in the data processing system of FIG. 1.

FIG. 5 is a flowchart illustrating an embodiment of operations of the master device when reading is performed in the data processing system of FIG. 1.

Referring to FIGS. 1 and 5, in S510, the master device 110 performs reading for the slave device 120. The controller 112 of the master device 110 may generate a read request. In response to the read request, the operations of the master device 110 described with reference to FIGS. 3 and 4 may be performed to read data in the slave device 120.

In S520, the master device 110 determines whether the data signal DS received from the slave device 120 corresponds to normal data. In reading of S510, the wire voltage signal WRS received through the second wire WR2 may include an indicator indicating validity of the received data signal DS. The master device 110 may determine whether the received data signal DS is normal by referring to the indicator. Referring to FIG. 4, when the eleventh clock pulse P11, which is the last clock pulse among the first to eleventh clock pulses P1 to P11, is generated, the read acknowledgement signal NAK may be provided, and the master device 110 may use the read acknowledgement signal NAK as the indicator. When the read acknowledgement signal NAK has the logic high, the master device 110 may determine the data signal DS as the normal data. When the read acknowledgement signal NAK does not have the logic high (for example, has the logic low), the master device 110 may determine the data signal DS as abnormal data.

Referring to FIG. 5 again, when the data signal DS received from the slave device 120 corresponds to the normal data, S530 is performed. When the data signal DS received from the slave device 120 corresponds to the abnormal data, S540 is performed.

In S530, the master device 110 provides the data bits according to the received data signal DS to the controller 112.

In S540, the master device 110 determines whether the number of reading times is greater than a predetermined number of reading times, for example, three times. When the number of reading times is not greater than the predetermined number of reading times, S510 is performed again. In S550, when the number of reading times is greater than the predetermined number of reading times, the master device 110 provides data to notify fail of reading to the controller 112.

In embodiments, S510 to S550 of FIG. 5 may be performed by the master interface 111.

Figure 6:
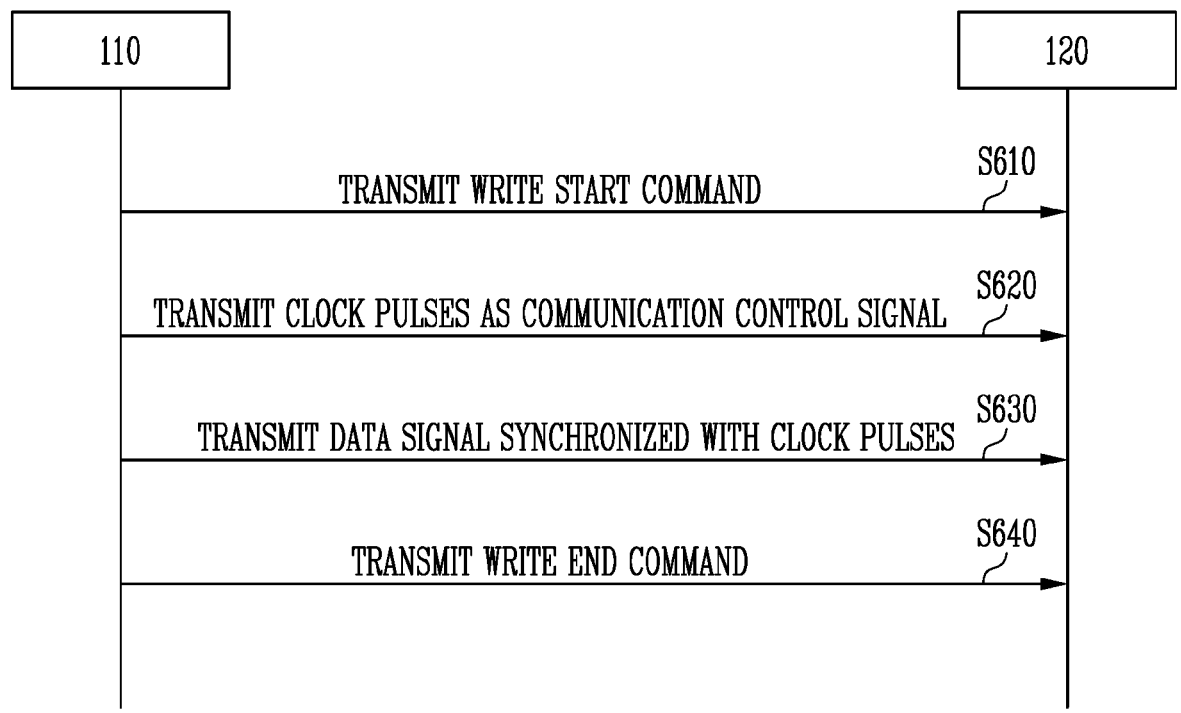
FIG. 6 is a flowchart illustrating operations of the master device and the slave device when writing is performed in the data processing system of FIG. 1.

FIG. 6 is a flowchart illustrating operations of the master device and the slave device when writing is performed in the data processing system of FIG. 1.

Referring to FIGS. 1 and 6, in S610, the master device 110 transmits the command indicating the start of the write mode (hereinafter, a write start command) to the slave device 120. According to an embodiment of the disclosure, the combination of the communication control signal CCTRL and the voltage of the second pad PD2 may be provided as the write start command. The combination of the communication control signal CCTRL maintaining the high voltage level and the voltage of the second pad PD2 transiting from the high voltage level to the low voltage level may be provided as the write start command.

In S620, the master device 110 transmits the clock pulses to the slave device 120 as the communication control signal CCTRL. In S630, while the clock pulses are transmitted, the master device 110 may transmit the data signal DS synchronized with the clock pulses to the slave device 120.

In S640, the master device 110 transmits the command indicating the end of the write mode (hereinafter, a write end command) to the slave device 120. According to an embodiment of the disclosure, the combination of the communication control signal CCTRL and the voltage of the second pad PD2 may be provided as the write end command. The combination of the communication control signal CCTRL maintaining the high voltage level and the voltage of the second pad PD2 transiting from the low voltage level to the high voltage level may be provided as the write end command.

Figure 7:
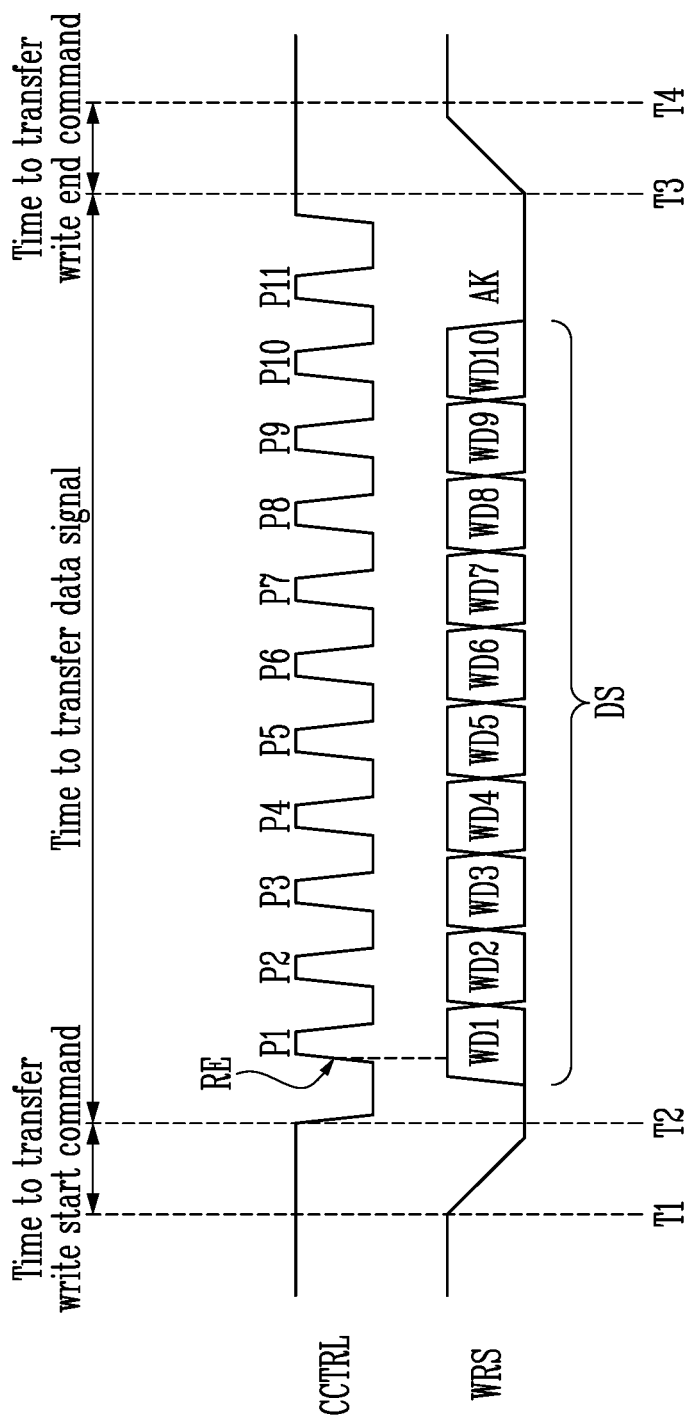
FIG. 7 is a timing diagram illustrating an embodiment of signals communicated between the master device and the slave device for the operations of FIG. 6.

FIG. 7 is a timing diagram illustrating an embodiment of signals communicated between the master device and the slave device for the operations of FIG. 6.

Referring to FIGS. 1 and 7, before the first time T1, the communication control signal CCTRL may have the high voltage level, and the wire voltage signal WRS may similarly have the high voltage level.

At the first time T1, the wire voltage signal WRS decreases from the high voltage level to the low voltage level. For example, the second sub interface 212 (refer to FIG. 2) of the master device 110 may bias the second wire WR2 to the low voltage level at the first time T1, and thus the wire voltage signal WRS may transit from the high voltage level to the low voltage level while maintaining the communication control signal CCTRL at the high voltage level.

As described above, the master device 110 may transmit the write start command to the slave device 120 by transiting the wire voltage signal WRS from the high voltage level to the low voltage level while controlling the communication control signal CCTRL to maintain the high voltage level. In other words, in the time period between the first time T1 and the second time T2, the combination of the wire voltage signal WRS transiting from the high voltage level to the low voltage level and the communication control signal CCTRL maintaining the high voltage level may be provided to the slave device 120 as the write start command. According to the write start command, the slave device 120 may detect the start of the write mode.

Thereafter, the time period from the second time T2 to the third time T3 corresponds to the write mode. In the write mode, the master device 110 may provide the communication control signal CCTRL as the first to eleventh clock pulses P1 to P11.

In the write mode, the master device 110 may transmit the data signal DS through the second wire WR2, and the data signal DS may be provided as the wire voltage signal WRS. The master device 110 may output the first to tenth write data units WD1 to WD10 synchronized with the first to tenth clock pulses P1 to P10 to the second wire WR2. Each of the first to tenth write data units WD1 to WD10 may express one data bit by having the logic high or the logic low. As described above, the first to tenth write data units WD1 to WD10 synchronized with the first to tenth clock pulses P1 to P10 may be provided as the data signal DS.

In embodiments, the first to tenth write data units WD1 to WD10 may be synchronized with the rising edges RE of the first to tenth clock pulses P1 to P10, respectively. The slave interface 121 of the slave device 120 may detect logic levels of the first to tenth write data units WD1 to WD10 in response to the rising edges RE of the first to tenth clock pulses P1 to P10, and may latch the data bits according to the detected logic levels.

The slave device 120 may output a write acknowledgment signal AK synchronized with the eleventh clock pulse P11 to the second wire WR2. The write acknowledgement signal AK may be a logic low. In embodiments, the fourth sub interface 222 of the slave device 120 may bias the second wire WR2 to a logic low when the eleventh clock pulse P11 is generated.

After the last clock pulse P11 is applied, the communication control signal CCTRL rises to the high voltage level. In embodiments, the first sub interface 211 of the master device 110 may not bias the first wire WR1 after the last clock pulse P11 is output. In this case, the communication control signal CCTRL may be controlled to have the high voltage level due to the first voltage VD1 (refer to FIG. 2).

At the third time T3, the wire voltage signal WRS increases from the low voltage level to the high voltage level. The communication control signal CCTRL maintains the high voltage level.

As described above, the master device 110 may transmit the write end command to the slave device 120 by transiting the wire voltage signal WRS from the low voltage level to the high voltage level while the communication control signal CCTRL maintains the high voltage level. In other words, in the time period between the third time T3 and the fourth time T4, the combination of the communication control signal CCTRL maintaining the high voltage level and the wire voltage signal WRS transiting from the low voltage level to the high voltage level may be provided to the slave device 120 as the write end command. According to the write end command, the slave device 120 may detect the end of the write mode.

In response to the write end command, the slave device 120 may provide data bits according to the first to tenth write data units WD1 to WD10 to the function block 122. The function block 122 may control the function performed thereby in response to the received data bits.

As described above, the combination of the communication control signal CCTRL and the wire voltage signal WRS may be provided as the write start command and the write end command. Accordingly, the master device 110 may transmit information indicating a type of an operation (for example, writing) to the slave device 120 without transmitting additional data bits to the slave device 120. In addition, the master device 110 may command one of a start and an end of a corresponding operation type to the slave device 120 without transmitting additional data bits. Therefore, the data processing system 100 may perform writing at an improved speed.

Figure 8:
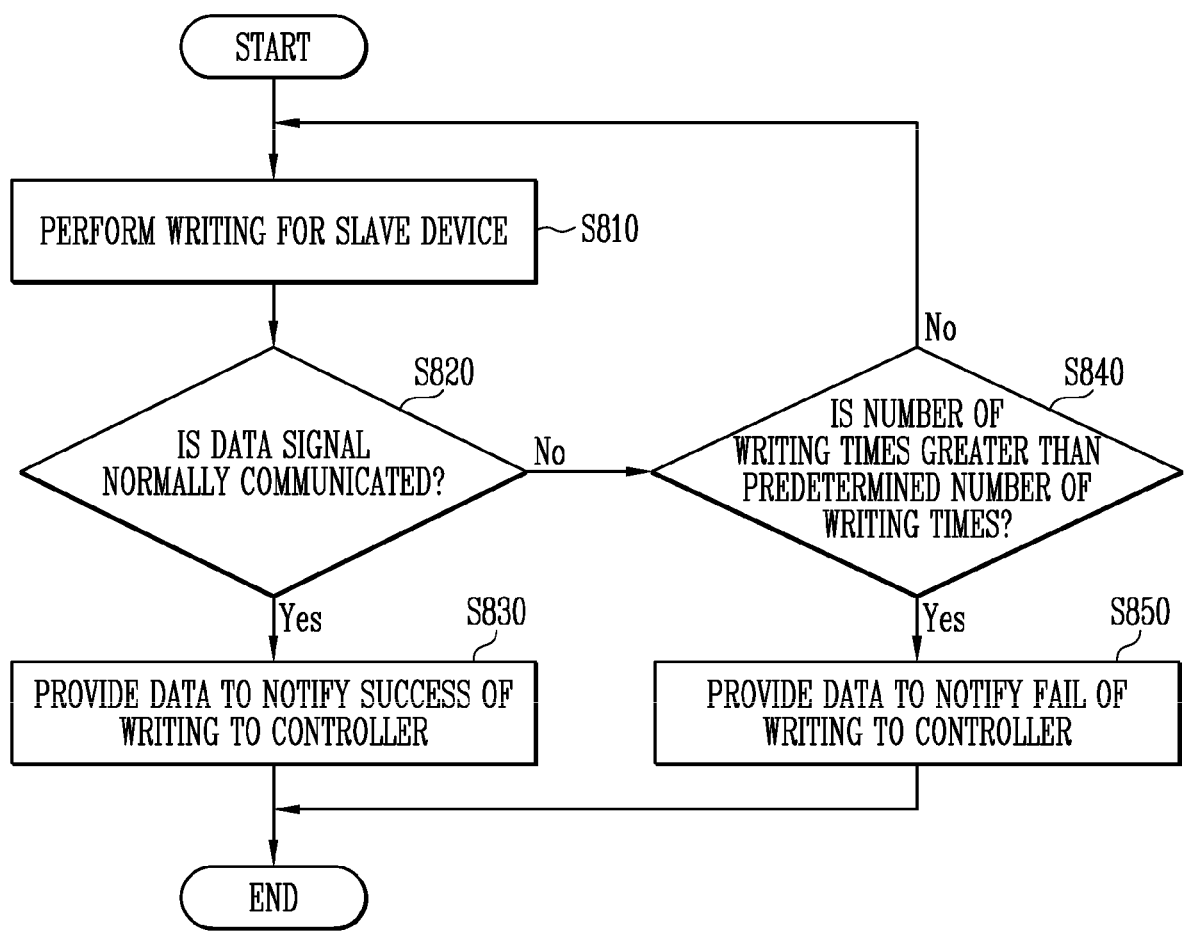
FIG. 8 is a flowchart illustrating an embodiment of operations of the master device when writing is performed in the data processing system of FIG. 1.

FIG. 8 is a flowchart illustrating an embodiment of operations of the master device when writing is performed in the data processing system of FIG. 1.

Referring to FIGS. 1 and 8, in S810, the master device 110 performs writing for the slave device 120. The controller 112 of the master device 110 may generate a write request. In response to the write request, the operations of the master device 110 described with reference to FIGS. 6 and 7 may be performed, and thus writing for the slave device 120 may be performed.

In S820, the master device 110 determines whether the data signal DS is normally communicated. In writing of S820, the wire voltage signal WRS transmitted through the second wire WR2 may include an indicator indicating validity of the data signal DS. The master device 110 may determine whether the data signal DS is normally transmitted to the slave device 120 by referring to the indicator. Referring to FIG. 7, when the eleventh clock pulse P11, which is the last clock pulse among the first to eleventh clock pulses P1 to P11, is generated, the write acknowledgement signal AK may be provided, and the master device 110 may use the write acknowledgement signal AK as the indicator. When the write acknowledgement signal AK has a logic low, the master device 110 may determine that the slave device 120 normally receives the first to tenth write data units WD1 to WD10, and this may mean that the data signal DS is normally communicated. When the write acknowledgement signal AK does not have the logic low (for example, when the write acknowledgement signal AK has the logic high), the master device 110 may determine that the slave device 120 does not receive the first to tenth write data units WD1 to WD10, and this may mean that the data signal DS is not normally communicated.

Referring to FIG. 8 again, when it is determined that the data signal DS is normally communicated, S830 is performed. When it is determined that the data signal DS is abnormally communicated, S840 is performed.

In S830, the master device 110 provides data to notify a success of writing to the controller 112.

In S840, the master device 110 determines whether the number of writing times is greater than a predetermined number of writing times, for example, three times. When the number of writing times is not greater than the predetermined number of writing times, S810 is performed again. In S850, when the number of writing times is greater than the predetermined number of writing times, the master device 110 provides data to notify a fail of writing to the controller 112.

In embodiments, S810 to S850 of FIG. 8 may be performed by the master interface 111.

The two wires WR1 and WR2 are used as a communication channel between the master device 110 and the slave device 120. I²C communication uses a serial data line and a serial clock line as a communication channel. Accordingly, the embodiments described with reference to FIGS. 3 to 8 may also be employed in a master device and a slave device employing the I²C communication. The number of clock pulses (for example, 11 clock pulses) of the communication control signal CCTRL of FIGS. 4 and 7 may be different from the number of clock pulses (for example, 9 clock pulses) of the I²C communication, and thus the I²C communication may not malfunction with communication according to the present embodiments.

Figure 9:
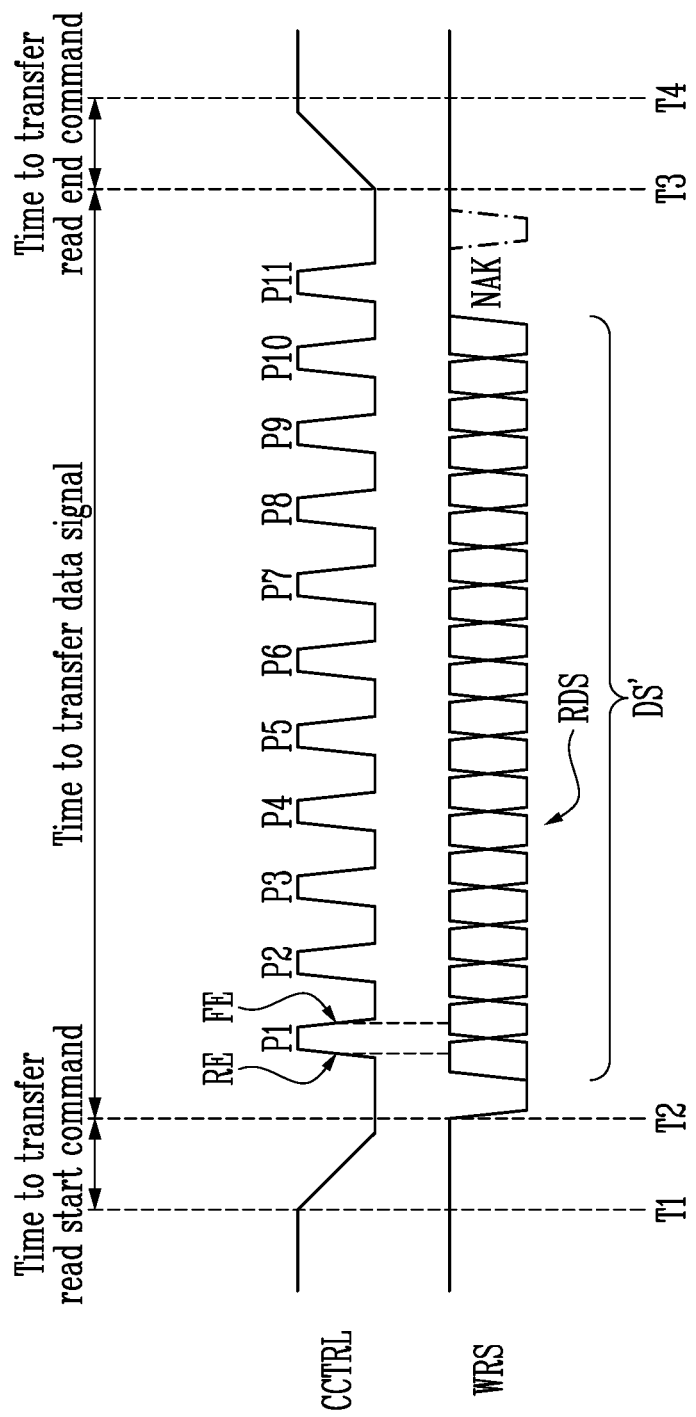
FIG. 9 is a timing diagram illustrating another embodiment of the signals communicated between the master device and the slave device during reading.

FIG. 9 is a timing diagram illustrating another embodiment of the signals communicated between the master device and the slave device during reading.

Referring to FIG. 9, in the read mode, a data signal DS' including read data units RDS is provided as the wire voltage signal WRS. The communication control signal CCTRL and the wire voltage signal WRS of FIG. 9 are described similarly to FIG. 4, except that the data signal DS' includes read data units RDS of the number greater than that of the data signal DS of FIG. 4. Hereinafter, an overlapping description is omitted.

In the read mode, the slave device 120 (refer to FIG. 1) may output the read data units RDS synchronized with the rising edges RE and falling edges FE of the first to tenth clock pulses P1 to P10. In other words, in addition to the first to tenth read data units RD1 to RD10 of FIG. 4 output in synchronization with the rising edges RE of the first to tenth clock pulses P1 to P10, the additional read data units synchronized with the falling edges FE of the first to tenth clock pulses P1 to P10 may be output. As described above, the slave device 120 may output two read data units in synchronization with the rising edge and the falling edge of each clock pulse. Accordingly, the greater number of read data units RDS may be communicated between the master device 110 and the slave device 120 during the read mode.

Figure 10:
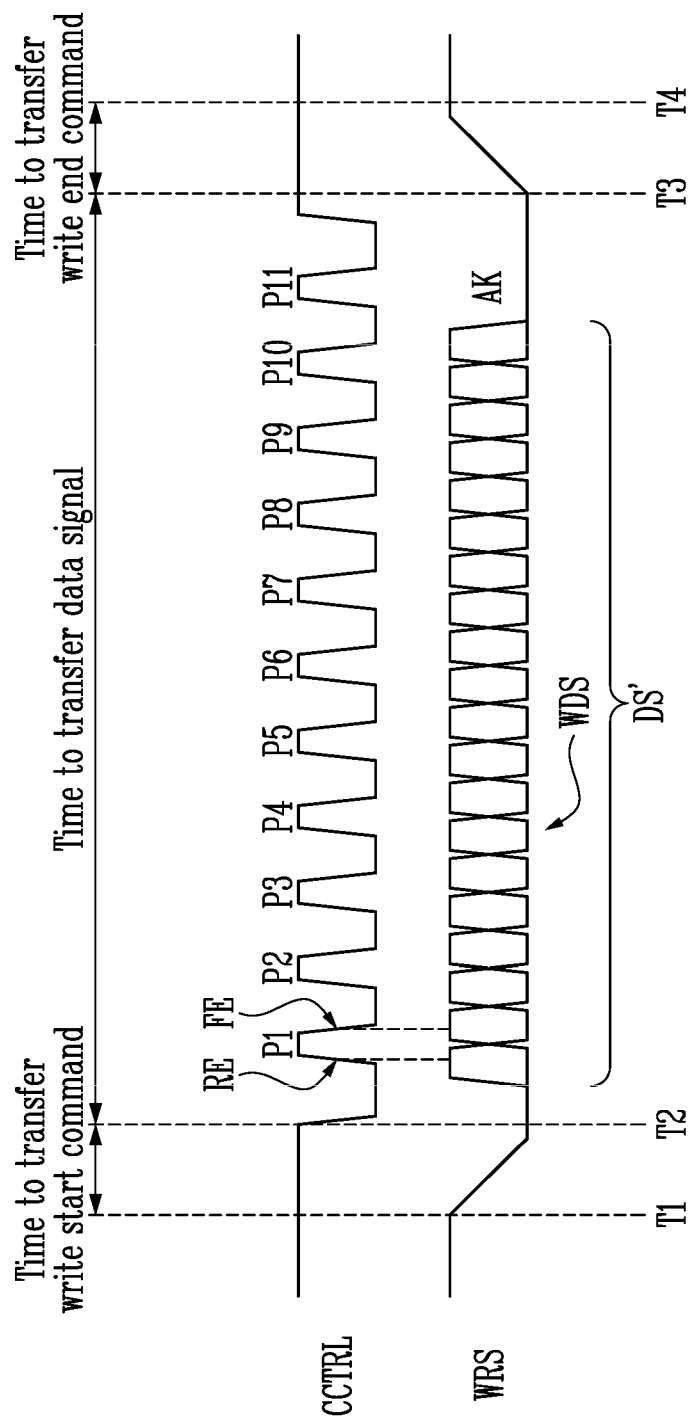
FIG. 10 is a timing diagram illustrating another embodiment of the signals communicated between the master device and the slave device during writing.

FIG. 10 is a timing diagram illustrating another embodiment of the signals communicated between the master device and the slave device during writing.

Referring to FIG. 10, during the write mode, a data signal DS' including write data units WDS is provided as the wire voltage signal WRS. The communication control signal CCTRL and the wire voltage signal WRS of FIG. 10 is described similarly to FIG. 7 except that the data signal DS' includes write data units WDS of the number greater than that of the data signal DS of FIG. 7. Hereinafter, an overlapping description is omitted.

In the write mode, the master device 110 (refer to FIG. 1) may output the write data units WDS synchronized with the rising edges RE and the falling edges FE of the first to tenth clock pulses P1 to P10. In other words, in addition to the first to tenth write data units WD1 to WD10 of FIG. 7 output in synchronization with the rising edges RE of the first to tenth clock pulses P1 to P10, the additional write data units synchronized with the falling edges FE of the first to tenth clock pulses P1 to P10 may be output. Accordingly, the greater number of write data units WDS may be communicated between the master device 110 and the slave device 120 during the write mode.

Figure 11:
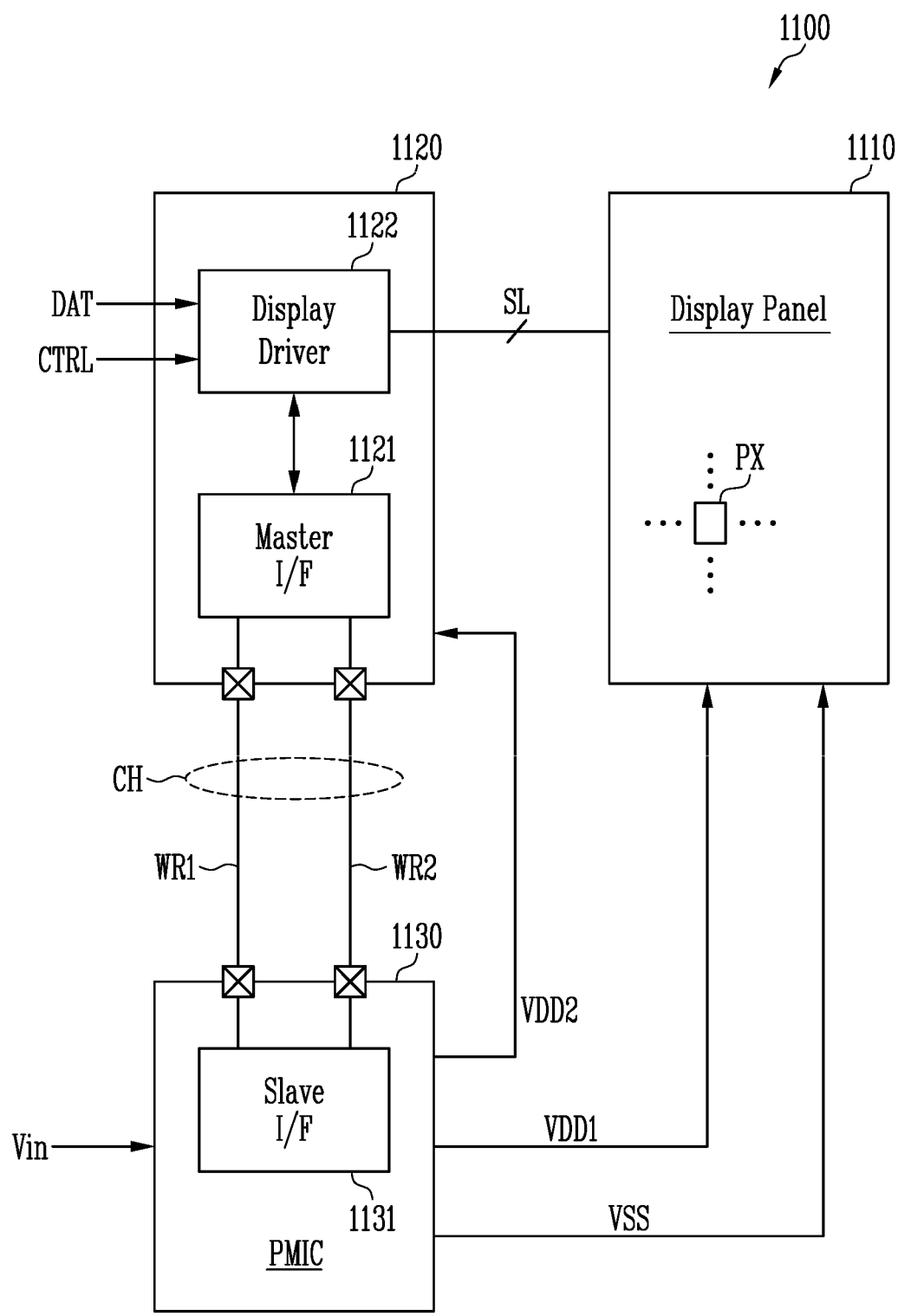
FIG. 11 is a block diagram illustrating a display device according to an embodiment of the disclosure.

FIG. 11 is a block diagram illustrating a display device according to an embodiment of the disclosure.

Referring to FIG. 11, the display device 1100 may include a display panel 1110, a driver integrated circuit 1120, and a power management integrated circuit (PMIC) 1130.

The display panel 1110 includes pixels PX. The display panel 1110 is connected to the driver integrated circuit 1120 through a plurality of signal lines SL. The display panel 1110 operates in response to control of the driver integrated circuit 1120.

The driver integrated circuit 1120 may include a master interface 1121 and a display driver 1122. The display driver 1122 may be connected to the display panel 1110 through the signal lines SL. The display driver 1122 receives image data DAT and control signals CTRL from an outside. The display driver 1122 displays the image data DAT on the display panel 1110 in response to the control signals CTRL. For example, the display driver 1122 may apply grayscale voltages corresponding to the image data DAT to the plurality of signal lines SL, and the pixels PX of the display panel 1110 may display an image according to the grayscale voltages applied through the plurality of signal lines SL.

The power management integrated circuit 1130 may supply a plurality of power voltages to components of the display device 1100. The power management integrated circuit 1130 receives an input voltage Vin from, for example, an external battery, and generates the plurality of power voltages using the received input voltage Vin. A first driving voltage VDD1 and a reference voltage VSS output from the power management integrated circuit 1130 may be provided to the display panel 1110. The reference voltage VSS has a level lower than that of the first driving voltage VDD1. A second driving voltage VDD2 output from the power management integrated circuit 1130 may be provided to the driver integrated circuit 1120. In embodiments, the second driving voltage VDD2 may be higher than the first driving voltage VDD1. The first driving voltage VDD1, the second driving voltage VDD2, and the reference voltage VSS may be included in the power voltages generated by the power management integrated circuit 1130.

The driver integrated circuit 1120 may correspond to the master device 110 of FIG. 1. The power management integrated circuit 1130 may correspond to the slave device 120 of FIG. 1. The power management integrated circuit 1130 may include a slave interface 1131. As described with reference to FIG. 1, the master interface 1121 and the slave interface 1131 may be connected to each other through the first wire WR1 and the second wire WR2. It may be understood that the first wire WR1 and the second wire WR2 form one communication channel CH.

The display driver 1122 may transmit the data bits to the power management integrated circuit 1130 by performing writing for the power management integrated circuit 1130, and the power management integrated circuit 1130 may operate in response to the transmitted data bits. In embodiments, the power management integrated circuit 1130 may include one or more function blocks configured to generate the first driving voltage VDD1, the second driving voltage VDD2, and the reference voltage VSS as the function block 122 of FIG. 1. In this case, the function blocks of the power management integrated circuit 1130 may adjust at least one of the first driving voltage VDD1, the second driving voltage VDD2, and the reference voltage VSS in response to the data bits transmitted from the display driver 1122. For example, the power management integrated circuit 1130 adjusts a level of the reference voltage VSS in response to the data bits transmitted from the display driver 1122.

The display driver 1122 may read the data bits from the power management integrated circuit 1130 by performing reading for the power management integrated circuit 1130. The display driver 1122 may obtain information related to the power management integrated circuit 1130 based on the read data bits. For example, the display driver 1122 may detect a voltage level of at least one of the power voltages generated by the power management integrated circuit 1130 based on the read data bits. For example, the display driver 1122 may detect the level of the reference voltage VSS based on the read data bits.

In embodiments, the display device 1100 may be employed in a computer system that operates using power from a battery such as a portable computer, a mobile phone, or a wearable device.

In embodiments, the power management integrated circuit 1130 is shown as being included in the display device 1100 in FIG. 1, but this is an example, and the power management integrated circuit 1130 may be provided as a component separated from the display device 1100.

Figure 12:
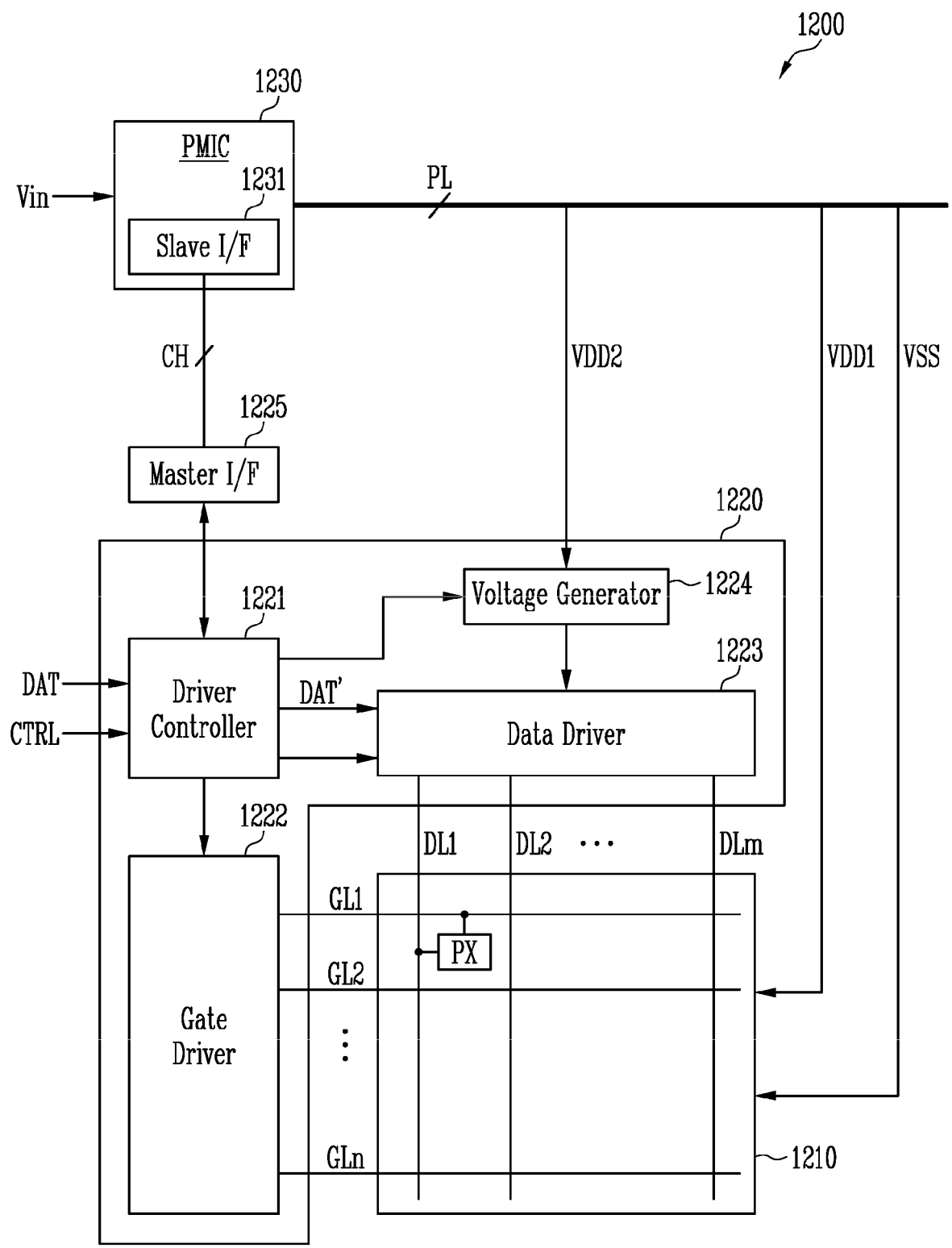
FIG. 12 is a block diagram illustrating an embodiment of the display device of FIG. 11.
Figure 13:
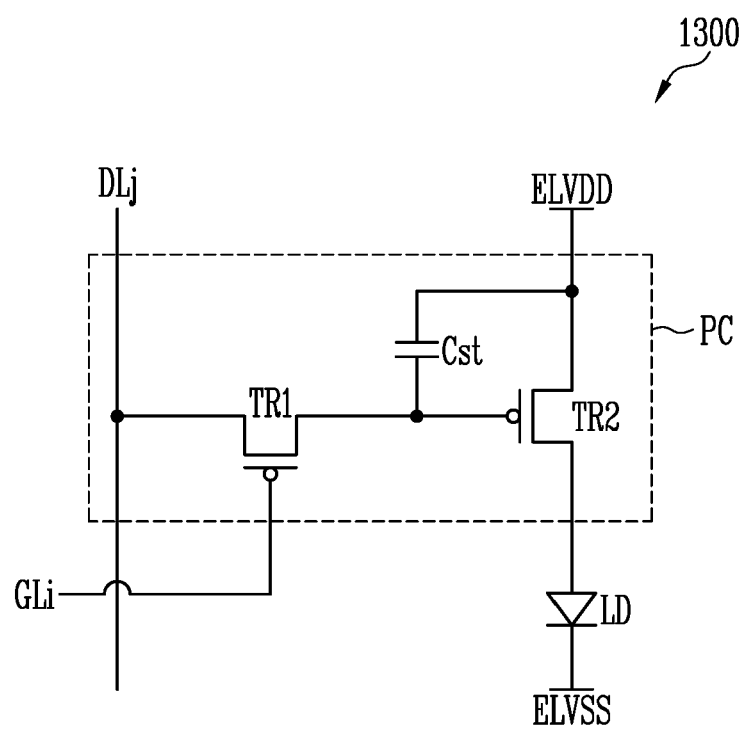
FIG. 13 is a circuit diagram illustrating any one of pixels of FIG. 12.

FIG. 12 is a block diagram illustrating an embodiment of the display device of FIG. 11. FIG. 13 is a circuit diagram illustrating any one of pixels of FIG. 12.

Referring to FIG. 12, the display panel 1210 includes pixels PX. The pixels PX are connected to a gate driver 1222 through first to n-th gate lines GL1 to GLn extending in the row direction, and are connected to a data driver 1223 through first to m-th data lines DL1 to DLm extending in a column direction. The first to m-th data lines DL1 to DLm and the first to n-th gate lines GL1 to GLn may be included in the signal lines SL of FIG. 11. The display panel 1210 may be provided as the display panel 1110 of FIG. 11.

The display panel 1210 may be at least one of various display panels such as a light-emitting diode (LED) panel and a liquid crystal display panel (LCD). Hereinafter, it is described that the display panel 1210 is the LED panel and includes LEDs in the pixels PX. However, embodiments are not limited thereto, and the display panel 1210 may be a display panel of another type.

The display panel 1210 may include the LED in each of the pixels PX. Referring to FIG. 13, a pixel 1300 connected to a j-th data line DLj and an i-th gate line GLi is shown (i is a positive integer less than or equal to n, and j is a positive integer less than or equal to m).

The pixel 1300 may include a pixel circuit PC and the LED LD. The pixel circuit PC may control the LED LD to emit light in response to signals of the gate line GLi and the data line DLj. In embodiments, the pixel circuit PC may include a first transistor TR1, a second transistor TR2, and a capacitor Cst. The first transistor TR1 is connected between the data line DLj and one end of the capacitor Cst, and a gate thereof is connected to the gate line GLi. The capacitor Cst has one end connected to the first transistor TR1 and another end connected to a first power voltage ELVDD. The second transistor TR2 is connected between the first power voltage ELVDD and the LED LD, and a gate thereof is connected to the one end of the capacitor Cst. The LED LD may include an anode electrode connected to the second transistor TR2 and a cathode electrode connected to a second power voltage ELVSS. The LED LD may include an inorganic LED and/or an organic LED.

The first transistor TR1 may output a voltage input through the data line DLj to one end of the capacitor Cst in response to a gate-on voltage input through the gate line GLi. Accordingly, the capacitor Cst may charge charges corresponding to a difference between a voltage received through the first transistor TR1 and the first power voltage ELVDD. The second transistor TR2 is turned on by the charges stored in the capacitor Cst. A voltage of the first power voltage ELVDD has a positive voltage level and a voltage of the second power voltage ELVSS has a voltage level lower than the first power voltage ELVDD. When the second transistor TR2 is turned on, a current flows from the first power voltage ELVDD to the second power voltage ELVSS through the LED LD, and the LED LD emits light. An amount of current flowing through the second transistor TR2 may be determined according to an amount of charges charged in the capacitor Cst.

In FIG. 13, the pixel circuit PC includes the two transistors TR1 and TR2 and the one capacitor Cst. However, this is an example and the pixel 1300 may have various circuit structures for controlling the LED LD. For example, the pixel 1300 may include seven transistors and at least one capacitor for controlling the LED LD.

In embodiments, the first driving voltage VDD1 of FIG. 12 may be provided as the first power voltage ELVDD and the reference voltage VSS of FIG. 12 may be provided as the second power voltage ELVSS to the display panel 1210. As described above, the first and second power voltages ELVDD and ELVSS may be supplied by a power management integrated circuit 1230.

Referring to FIG. 12 again, the display driver 1220 may include a driver controller 1221, the gate driver 1222, the data driver 1223, and a voltage generator 1224. The display driver 1220 may correspond to the display driver 1122 of FIG. 11.

The driver controller 1221 controls overall operations of the display device 1200. The driver controller 1221 adjusts a timing of the image data DAT based on the control signals CTRL and provides image signal data DAT' to the data driver 1223. In addition, the driver controller 1221 may control the gate driver 1222, the data driver 1223, and the voltage generator 1224 based on the control signals CTRL so that the image signal data DAT' is displayed on the display panel 1210.

The gate driver 1222 drives the first to n-th gate lines GL1 to GLn in response to control signal supplied from the driver controller 1221. In embodiments, the gate driver 1222 may be implemented as a circuit using an amorphous silicon gate (ASG) using an amorphous silicon thin film transistor (a-Si TFT), an oxide semiconductor, a crystalline semiconductor, a polycrystalline semiconductor, or the like.

The data driver 1223 may drive the first to m-th data lines DL1 to DLm in response to the control of the driver controller 1221. The data driver 1223 may apply grayscale voltages corresponding to the image signal data DAT' to the first to m-th data lines DL1 to DLm using a voltage from the voltage generator 1224.

When each of the gate lines GL1 to GLn is driven with the gate-on voltage by the gate driver 1222, the grayscale voltages corresponding to the image signal data DAT' may be applied to the first to m-th data lines DL1 to DLm by the data driver 1223. Accordingly, the grayscale voltages corresponding to the image signal data DAT' may be provided to the pixels PX of the corresponding gate line, and the pixels PX may output light of a luminance corresponding to the grayscale voltages. Accordingly, an image is displayed on the display panel 1210.

The voltage generator 1224 may operate in response to the control of the driver controller 1221. The voltage generator 1224 may receive the second driving voltage VDD2 from the power management integrated circuit 1230 through power lines PL, and generate voltages required for an operation of the display panel 1210 using the second driving voltage VDD2. For example, the voltage generator 1224 may generate a gamma voltage using the second driving voltage VDD2 and provide the generated gamma voltage to the data driver 1223.

The power management integrated circuit 1230 is connected to the power lines PL. The power management integrated circuit 1230 generates the power voltages using the input voltage Vin and outputs the generated power voltages through the power lines PL. The power management integrated circuit 1230 may provide the first driving voltage VDD1 and the reference voltage VSS to the display panel 1210 through some of the power lines PL. The power management integrated circuit 1230 may provide the second driving voltage VDD2 to the voltage generator 1224 through another of the power lines PL. The power management integrated circuit 1230 may correspond to the power management integrated circuit 1130 of FIG. 11.

A master interface 1225 may be further provided, and the display driver 1220 and the master interface 1225 may configure the driver integrated circuit 1120 of FIG. 11.

As described with reference to FIG. 11, the driver integrated circuit including the display driver 1220 and the master interface 1225 may function as the master device 110 of FIG. 1. The power management integrated circuit 1230 may function as the slave device 120 of FIG. 1. The power management integrated circuit 1230 may include a slave interface 1231.

The master interface 1225 and the slave interface 1231 may be connected through a communication channel CH as described with reference to FIG. 11. Accordingly, the driver controller 1221 may access the power management integrated circuit 1230 through the master interface 1225 and control the power management integrated circuit 1230.

The driver controller 1221 may transmit the data bits to the power management integrated circuit 1230 through the communication channel CH, and control at least one of the first driving voltage VDD1, the second driving voltage VDD2, and the reference voltage VSS. In embodiments, the display device 1200 may support a plurality of luminance modes and one of the plurality of luminance modes may be selected. The driver controller 1221 may adjust a level of the second power voltage ELVSS of FIG. 13 by controlling the power management integrated circuit 1230 according to the selected luminance mode.

The driver controller 1221 may read the data bits from the power management integrated circuit 1230 through the communication channel CH. The driver controller 1221 may detect (or check) information related to the power management integrated circuit 1230, for example, the level of the second power voltage ELVSS, based on the read data bits.

Figure 14:
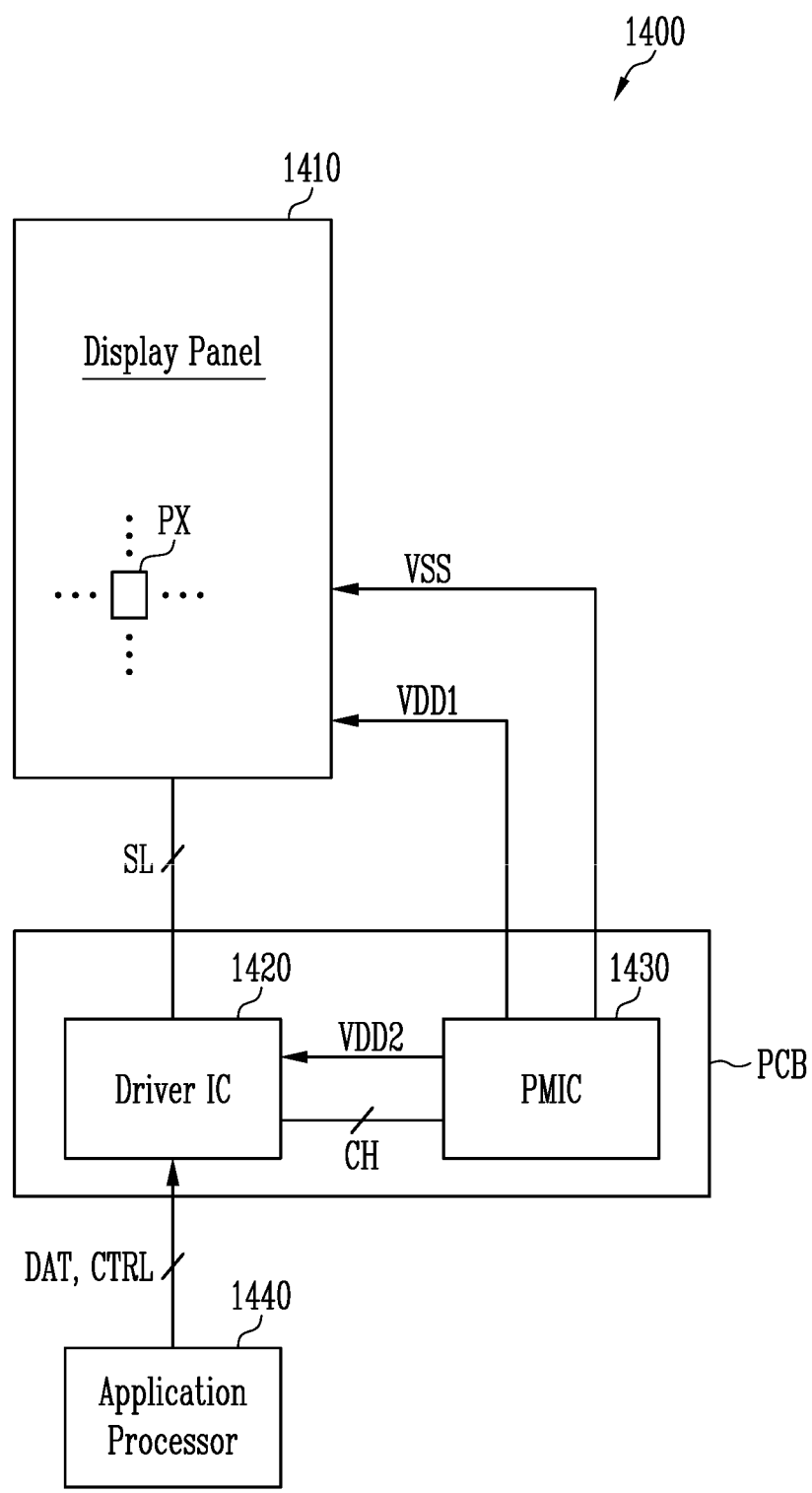
FIG. 14 is a block diagram illustrating an embodiment of a display system including the display device of FIG. 11.

FIG. 14 is a block diagram illustrating an embodiment of a display system including the display device of FIG. 11.

Referring to FIG. 14, the display system 1400 may include a display panel 1410, a driver integrated circuit 1420, a power management integrated circuit 1430, and an application processor 1440.

The display panel 1410, the driver integrated circuit 1420, and the power management integrated circuit 1430 are configured similarly to the display panel 1110, the driver integrated circuit 1120, and the power management integrated circuit 1130 of FIG. 11, respectively. Hereinafter, an overlapping description is omitted.

The application processor 1440 may function as a host in the display system 1400. As described with reference to FIG. 11, the application processor 1440 may transmit the image data DAT and the control signals CTRL to the driver integrated circuit 1420.

The power management integrated circuit 1430 may be mounted on one circuit board PCB together with the driver integrated circuit 1420. Since at least some of power voltages generated by the power management integrated circuit 1430 have relatively high levels, a voltage and a current associated with the power management integrated circuit 1430 may be relatively high. Accordingly, the power management integrated circuit 1430 may dissipate a relatively large amount of heat. The power management integrated circuit 1430 may be disposed in an area spaced apart from the driver integrated circuit 1420 on the circuit board PCB, and in this case, reliability of an operation of the driver integrated circuit 1420 may not be reduced.

Figure 15:
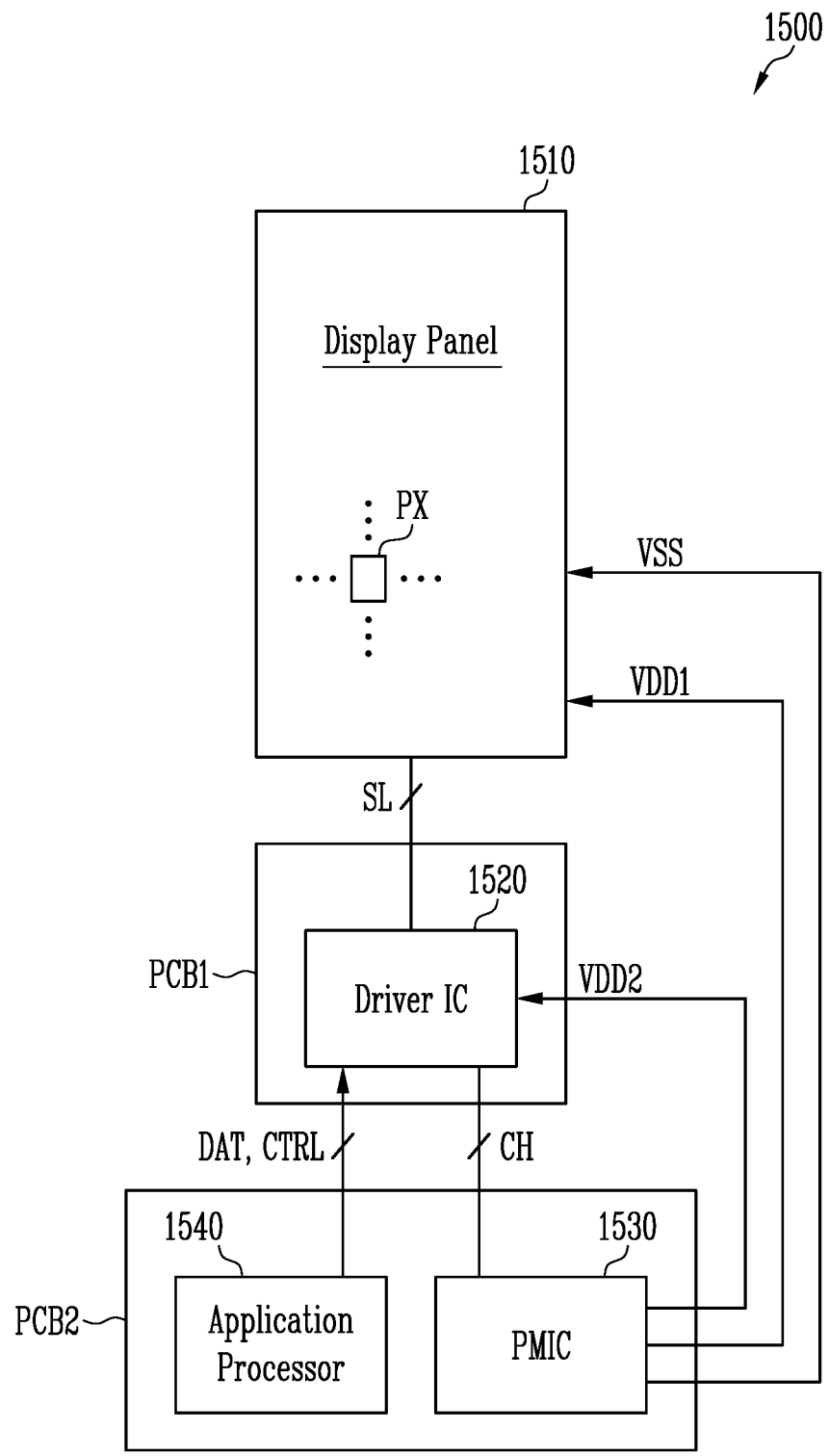
FIG. 15 is a block diagram illustrating another embodiment of the display system including the display device of FIG. 11.

FIG. 15 is a block diagram illustrating another embodiment of the display system including the display device of FIG. 11.

The display system 1500 may include a display panel 1510, a driver integrated circuit 1520, a power management integrated circuit 1530, and an application processor 1540.

The display panel 1510, the driver integrated circuit 1520, the power management integrated circuit 1530, and the application processor 1540 may be configured similarly to the display panel 1410, the driver integrated circuit 1420, the power management integrated circuit 1430, and the application processor 1440 of FIG. 14, respectively. Hereinafter, an overlapping description is omitted.

The driver integrated circuit 1520 may be mounted on a first circuit board PCB1. The power management integrated circuit 1530 may be mounted on a second circuit board PCB2 separated from the first circuit board PCB1. For example, as shown in FIG. 15, the application processor 1540 may be mounted on the second circuit board PCB2 and the power management integrated circuit 1530 may be mounted on the second circuit board PCB2 the same circuit board on which the application processor 1540 is mounted.

Accordingly, even though the power management integrated circuit 1530 dissipate a relatively large amount of heat, reliability of an operation of the driver integrated circuit 1520 may not be reduced.

The second circuit board PCB2 may have a relatively large size. The power management integrated circuit 1530 may be disposed in an area spaced apart from the application processor 1540 on the second circuit board PCB2. Accordingly, reliability of an operation of the application processor 1540 may not be reduced.

Although specific embodiments and application examples are described herein, other embodiments and modifications may derive from the above description. Therefore, the spirit of the disclosure is not limited to these embodiments, and extends to the claims set forth below, various obvious modifications, and equivalents.

What is claimed is:

1. A master device to communicate with a slave device, the master device comprising:
    a first pad connected to the slave device through a first wire;
    a second pad connected to the slave device through a second wire; and
    a communication interface to transmit a communication control signal to the slave device through the first pad, and, through the second pad, to transmit a first data signal synchronized with the communication control signal to the slave device and to receive a second data signal synchronized with the communication control signal from the slave device,
    wherein the first data signal is transmitted to the slave device by the master device in a write mode and the second data signal is transmitted to the master device by the slave device in a read mode, and
    wherein the communication interface is configured to start the read mode by transiting the communication control signal from a first voltage level to a second voltage level while the second pad has a predetermined voltage level.

2. The master device according to claim 1, wherein the communication interface is configured to transmit a plurality of clock pulses to the slave device as the communication control signal after the read mode is started.

3. The master device according to claim 2, wherein, in the read mode, the second data signal transmitted by the slave device is synchronized with at least some of the plurality of clock pulses.

4. The master device according to claim 2, further comprising:
    a controller to control the communication interface,
    wherein the communication interface is configured to provide data bits corresponding to the second data signal to the controller in response to a voltage of the second pad having a logic high at a time when a last clock pulse of the plurality of clock pulses is transmitted.

5. The master device according to claim 2, wherein the first data signal has a voltage that changes to a first logic level and a second logic level in synchronization with the plurality of clock pulses, and
    wherein the predetermined voltage level corresponds to the first logic level.

6. The master device according to claim 1, wherein the second voltage level is lower than the first voltage level.

7. The master device according to claim 1, wherein, in the read mode, after the second data signal is transmitted by the slave device, the second pad is biased to the predetermined voltage level, and
    wherein the communication interface is configured to end the read mode by transiting the communication control signal from the second voltage level to the first voltage level while the second pad has the predetermined voltage level.

8. The master device according to claim 1, wherein the communication interface is configured to start the write mode by transiting a voltage of the second pad from a first logic level to a second logic level while controlling the communication control signal to have the first voltage level, and
    wherein the predetermined voltage level corresponds to the first logic level.

9. The master device according to claim 8, wherein the communication interface is configured to transmit a plurality of clock pulses to the slave device as the communication control signal after the write mode is started and to transmit the first data signal to the slave device in synchronization with the plurality of clock pulses.

10. The master device according to claim 8, wherein after the first data signal is transmitted to the slave device in the write mode, the communication interface is configured to end the write mode by transiting the voltage of the second pad from the second logic level to the first logic level while controlling the communication control signal to have the first voltage level.

11. A method of controlling a master device connected to a slave device through a first wire and a second wire to communicates with the slave device, the method comprising:
    transmitting a read start command to the slave device; and
    receiving a data signal from the slave device through the second wire while transmitting a communication control signal to the first wire after the read start command is transmitted,
    wherein transmitting the read start command comprises outputting the read start command by transiting the communication control signal from a first voltage level to a second voltage level while the second wire has a predetermined voltage level.

12. The method according to claim 11, wherein the receiving the data signal from the slave device comprises transmitting a plurality of clock pulses to the slave device as the communication control signal, and
    wherein the data signal is synchronized with the plurality of clock pulses.

13. The method according to claim 12, further comprising:
    determining data bits corresponding to the data signal as normal data in response to a voltage of the second wire having a logic high at a time when a last clock pulse of the plurality of clock pulses is transmitted.

14. The method according to claim 12, further comprising:
    transmitting the read start command to the slave device again in response to a voltage of the second wire which does not have a logic high at a time when a last clock pulse of the plurality of clock pulses is transmitted.

15. The method according to claim 11, further comprising:
    outputting a read end command by transiting the communication control signal from the second voltage level to the first voltage level while the second wire has the predetermined voltage level after the data signal is received from the slave device.

16. The method according to claim 11, further comprising:
    transmitting a write start command to the slave device; and
    transmitting another data signal to the slave device through the second wire while transmitting the communication control signal to the first wire, after the write start command is transmitted,
    wherein the transmitting the write start command comprises outputting the write start command by transiting a voltage of the second wire from a first logic level to a second logic level while controlling the communication control signal to have the first voltage level.

17. A display device comprising:
a display panel; and
a driver integrated circuit connected to the display panel through a plurality of signal lines to drive the display panel,
wherein the driver integrated circuit comprises:
a first pad and a second pad connected to a power management integrated circuit configured to provide a power voltage to at least one of the display panel and the driver integrated circuit; and
a communication interface to transmit a communication control signal to the power management integrated circuit through the first pad, and, through the second pad, to transmit a first data signal synchronized with the communication control signal to the power management integrated circuit and to receive a second data signal synchronized with the communication control signal from the power management integrated circuit,
wherein the first data signal is transmitted to the power management integrated circuit by the driver integrated circuit in a write mode, and the second data signal is transmitted to the driver integrated circuit by the power management integrated circuit in a read mode, and
wherein the communication interface is configured to start the read mode by transiting the communication control signal from a first voltage level to a second voltage level while the second pad has a predetermined voltage level.

18. The display device according to claim 17, wherein the communication interface is configured to start the write mode by transiting a voltage of the second pad from a first logic level to a second logic level while controlling the communication control signal to have the first voltage level, and
wherein the predetermined voltage level corresponds to the first logic level.

19. The display device according to claim 17, wherein, in the write mode, the power voltage is adjusted according to the first data signal transmitted to the power management integrated circuit by the driver integrated circuit.

20. The display device according to claim 17, wherein the driver integrated circuit is mounted on a circuit board different from a circuit board on which the power management integrated circuit is mounted.

21. A slave device to communicate with a master device, the slave device comprising:
a first pad connected to the master device through a first wire;
a second pad connected to the master device through a second wire; and
a communication interface to receive a communication control signal from the master device through the first pad and to communicate a data signal synchronized with the communication control signal with the master device through the second pad,
wherein a first data signal is transmitted to the slave device by the master device in a write mode and a second data signal is transmitted to the master device by the slave device in a read mode, and
wherein the communication interface is configured to detect the read mode when the communication control signal transits from a first voltage level to a second voltage level while the second pad has a predetermined voltage level, and to transmit the second data signal to the master device to be synchronized with the communication control signal.

22. The slave device according to claim 21, further comprising:
a storage medium coupled to the communication interface,
wherein the communication interface is configured to store data bits according to the first data signal, which is transmitted from the master device, in the storage medium in the write mode, and to transmit the second data signal to the master device according to the data bits stored in the storage medium in the read mode.

* * * * *